United States Patent
Bickham et al.

(10) Patent No.: US 12,055,753 B2
(45) Date of Patent: Aug. 6, 2024

(54) REDUCED COATING DIAMETER CHLORINE-DOPED SILICA OPTICAL FIBERS WITH LOW LOSS AND MICROBEND SENSITIVITY

(71) Applicant: CORNING INCORPORATED, Corning, NY (US)

(72) Inventors: Scott Robertson Bickham, Corning, NY (US); Ming-Jun Li, Horseheads, NY (US); Snigdharaj Kumar Mishra, Wilmington, NC (US); Pushkar Tandon, Painted Post, NY (US); Ruchi Sarda Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/241,178

(22) Filed: Aug. 31, 2023

(65) Prior Publication Data

US 2023/0408760 A1 Dec. 21, 2023

Related U.S. Application Data

(62) Division of application No. 17/146,881, filed on Jan. 12, 2021, now abandoned.
(Continued)

(51) Int. Cl.
*G02B 6/02* (2006.01)
*C09D 4/00* (2006.01)
(Continued)

(52) U.S. Cl.
CPC ........... *G02B 6/02395* (2013.01); *C09D 4/00* (2013.01); *C09D 133/14* (2013.01);
(Continued)

(58) Field of Classification Search
CPC .............. G02B 6/02395; G02B 6/0281; G02B 6/03627; G02B 6/0365; C09D 4/00; C09D 133/14; C09D 175/04; C03C 25/1065
See application file for complete search history.

(56) References Cited

U.S. PATENT DOCUMENTS

| | | |
|---|---|---|
| 4,372,997 A | 2/1983 | Fritze et al. |
| 4,474,830 A | 10/1984 | Taylor |

(Continued)

FOREIGN PATENT DOCUMENTS

| | | |
|---|---|---|
| JP | 2008-058662 A | 3/2008 |
| JP | 2012-516457 A | 7/2012 |
| JP | 2015-521300 A | 7/2015 |

OTHER PUBLICATIONS

Bennett et al; "Small Diameter Low Attenuation Optical Fiber"; Filed as U.S. Appl. No. 16/391,859, filed Apr. 23, 2019; 66 Pages—Listed in ID as D28911.

(Continued)

*Primary Examiner* — Andrew Jordan
(74) *Attorney, Agent, or Firm* — Kevin L. Bray

(57) ABSTRACT

The optical fiber disclosed has a glass fiber including a core and a cladding. The core comprises silica glass doped with chlorine and having an outer radius $r_1$ between 3.0 microns and 10.0 microns. The cladding has an outer radius $r_4$ not less than 50.0 microns. A primary coating surrounding the cladding has a thickness ($r_5$-$r_4$) between 5.0 microns and 20.0 microns, and an in situ modulus less than 0.30 MPa. A secondary coating surrounding the primary coating has a thickness ($r_6$-$r_5$) between 8.0 microns and 30.0 microns, a Young's modulus greater than 1500 MPa, and a normalized puncture load greater than $3.6 \times 10^{-3}$ g/micron$^2$. The optical fiber has a 22-meter cable cutoff wavelength less than 1530

(Continued)

nm, an attenuation at 1550 nm of less than 0.17 dB/km, and a bending loss at 1550 nm of less than 3.0 dB/turn.

20 Claims, 12 Drawing Sheets

Related U.S. Application Data

(60) Provisional application No. 62/962,600, filed on Jan. 17, 2020.

(51) Int. Cl.
*C09D 133/14* (2006.01)
*C09D 175/04* (2006.01)
*G02B 6/028* (2006.01)
*G02B 6/036* (2006.01)

(52) U.S. Cl.
CPC ......... *C09D 175/04* (2013.01); *G02B 6/0281* (2013.01); *G02B 6/03627* (2013.01); *G02B 6/0365* (2013.01)

(56) References Cited

U.S. PATENT DOCUMENTS

| | | | |
|---|---|---|---|
| 4,585,165 A | 4/1986 | Iversen | |
| 4,609,718 A | 9/1986 | Bishop et al. | |
| 4,629,287 A | 12/1986 | Bishop | |
| 4,735,475 A | 4/1988 | Watanabe et al. | |
| 4,798,852 A | 1/1989 | Zimmerman et al. | |
| 4,962,992 A | 10/1990 | Chapin et al. | |
| 5,104,433 A | 4/1992 | Chapin et al. | |
| 5,410,567 A | 4/1995 | Brundage et al. | |
| 6,027,062 A | 2/2000 | Bacon et al. | |
| 6,045,269 A | 4/2000 | Watanabe et al. | |
| 6,091,915 A | 7/2000 | Takagishi | |
| 6,288,835 B1 | 9/2001 | Nilsson et al. | |
| 6,316,516 B1 | 11/2001 | Chien et al. | |
| 6,326,416 B1 | 12/2001 | Chien et al. | |
| 6,504,981 B1 | 1/2003 | Morley et al. | |
| 6,539,152 B1 | 3/2003 | Fewkes et al. | |
| 6,563,996 B1 | 5/2003 | Winningham | |
| 6,711,330 B1 | 3/2004 | Donlagic | |
| 6,757,471 B2 | 6/2004 | Jeong et al. | |
| 6,795,634 B2 | 9/2004 | Jeong et al. | |
| 6,882,790 B2 | 4/2005 | Niiyama et al. | |
| 7,373,053 B2 | 5/2008 | Takahashi et al. | |
| 7,433,566 B2 | 10/2008 | Bookbinder et al. | |
| 7,536,076 B2 | 5/2009 | Khrapko et al. | |
| 7,565,820 B2 | 7/2009 | Foster et al. | |
| 7,620,282 B2 | 11/2009 | Bickham et al. | |
| 7,805,039 B2 | 9/2010 | Sanders et al. | |
| 7,832,675 B2 | 11/2010 | Bumgarner et al. | |
| 7,876,994 B2 | 1/2011 | Hiroi et al. | |
| 7,903,918 B1 | 3/2011 | Bickham et al. | |
| 8,145,026 B2 | 3/2012 | Overton et al. | |
| 8,405,292 B2 | 3/2013 | Nomura et al. | |
| 8,428,411 B2 | 4/2013 | De Montmorillon et al. | |
| 8,659,221 B2 | 2/2014 | Jones et al. | |
| 8,716,378 B2 | 5/2014 | Ding et al. | |
| 9,057,814 B2 * | 6/2015 | Bickham ............ G02B 6/0281 | |
| 9,057,817 B2 | 6/2015 | Bookbinder et al. | |
| 9,097,834 B2 | 8/2015 | Hirano et al. | |
| 9,139,466 B2 | 9/2015 | Hirano et al. | |
| 9,246,134 B2 | 1/2016 | Schwartz et al. | |
| 9,383,511 B2 * | 7/2016 | Bickham ............ C03C 25/1065 | |
| 9,389,382 B2 | 7/2016 | Blazer et al. | |
| 9,512,033 B2 | 12/2016 | Hirano et al. | |
| 9,594,210 B2 | 3/2017 | Bookbinder et al. | |
| 9,690,033 B2 | 6/2017 | Baker et al. | |
| 9,709,750 B1 | 7/2017 | Kuang et al. | |
| 9,741,777 B2 | 8/2017 | Wang | |
| 9,798,079 B2 | 10/2017 | Bookbinder et al. | |
| 9,799,853 B2 | 10/2017 | Lamansky et al. | |
| 9,841,558 B2 | 12/2017 | Tanaka et al. | |
| 9,851,499 B2 | 12/2017 | Bookbinder et al. | |
| 10,048,438 B2 | 8/2018 | Bookbinder et al. | |
| 10,048,455 B2 | 8/2018 | Pfnuer | |
| 10,082,622 B2 | 9/2018 | Bookbinder et al. | |
| 10,094,973 B2 * | 10/2018 | Bickham ............ G02B 6/02009 | |
| 10,197,728 B2 | 2/2019 | Borel et al. | |
| 10,451,795 B2 | 10/2019 | Konstadinidis et al. | |
| 10,557,987 B2 | 2/2020 | Alkeskjold et al. | |
| 10,718,908 B2 | 7/2020 | Yang | |
| 10,816,743 B2 | 10/2020 | Bickham et al. | |
| 10,942,316 B1 | 3/2021 | Feng et al. | |
| 11,009,655 B2 * | 5/2021 | Bookbinder ...... C08F 222/1025 | |
| 11,034,836 B2 | 6/2021 | Sato et al. | |
| 11,036,000 B2 | 6/2021 | Bickham et al. | |
| 11,054,573 B2 | 7/2021 | Bickham et al. | |
| 11,119,270 B2 * | 9/2021 | Bickham ............ G02B 6/02395 | |
| 11,150,403 B2 * | 10/2021 | Bookbinder ........ G02B 6/02395 | |
| 11,175,450 B2 | 11/2021 | Bookbinder et al. | |
| 11,181,685 B2 | 11/2021 | Abedijaberi et al. | |
| 11,579,359 B2 * | 2/2023 | Bennett ................ C03C 13/045 | |
| 11,675,122 B2 * | 6/2023 | Bickham ............ G02B 6/02395 385/124 |
| 11,733,453 B2 * | 8/2023 | Bennett .............. C08G 18/3221 385/126 |
| 2002/0076189 A1 | 6/2002 | McMullin et al. | |
| 2002/0159731 A1 | 10/2002 | Gruner-Nielsen et al. | |
| 2003/0077059 A1 | 4/2003 | Chien et al. | |
| 2003/0118307 A1 | 6/2003 | Gruner-Nielsen et al. | |
| 2003/0123839 A1 | 7/2003 | Chou et al. | |
| 2003/0156814 A1 | 8/2003 | Yoon et al. | |
| 2004/0005127 A1 | 1/2004 | Kliner et al. | |
| 2004/0108980 A1 | 6/2004 | Yonekubo et al. | |
| 2004/0217702 A1 | 11/2004 | Garner et al. | |
| 2007/0077016 A1 | 4/2007 | Bickham et al. | |
| 2007/0182297 A1 | 8/2007 | Drazic et al. | |
| 2007/0205418 A1 | 9/2007 | Takahashi | |
| 2008/0013905 A1 | 1/2008 | Bookbinder et al. | |
| 2008/0253132 A1 | 10/2008 | Urabe et al. | |
| 2008/0310805 A1 | 12/2008 | Sugizaki et al. | |
| 2009/0266471 A1 | 10/2009 | Kim et al. | |
| 2010/0013741 A1 | 1/2010 | Watanabe | |
| 2010/0082138 A1 | 4/2010 | Hayes et al. | |
| 2010/0290781 A1 | 11/2010 | Overton et al. | |
| 2011/0038593 A1 | 2/2011 | Chien et al. | |
| 2011/0091175 A1 | 4/2011 | Sanders et al. | |
| 2011/0188822 A1 | 8/2011 | Konstadinidis et al. | |
| 2011/0222828 A1 | 9/2011 | Sasaoka et al. | |
| 2011/0229101 A1 | 9/2011 | De Montmorillon et al. | |
| 2011/0241539 A1 | 10/2011 | Yan et al. | |
| 2011/0254437 A1 | 10/2011 | Yamada et al. | |
| 2012/0155093 A1 | 6/2012 | Yagi et al. | |
| 2012/0189258 A1 | 7/2012 | Overton et al. | |
| 2012/0234460 A1 | 9/2012 | Zhang et al. | |
| 2012/0262943 A1 | 10/2012 | Urabe et al. | |
| 2013/0039626 A1 | 2/2013 | Bickham et al. | |
| 2013/0193592 A1 | 8/2013 | Peil et al. | |
| 2013/0243382 A1 | 9/2013 | Li et al. | |
| 2013/0322837 A1 | 12/2013 | Bickham et al. | |
| 2014/0294355 A1 | 10/2014 | Bickham et al. | |
| 2014/0308015 A1 | 10/2014 | Bookbinder et al. | |
| 2014/0328566 A1 | 11/2014 | Bickham et al. | |
| 2014/0370287 A1 | 12/2014 | Tamura et al. | |
| 2015/0048407 A1 | 2/2015 | Peil et al. | |
| 2015/0086161 A1 | 3/2015 | Bickham et al. | |
| 2015/0214507 A1 | 7/2015 | Krall et al. | |
| 2015/0228929 A1 | 8/2015 | Lamansky et al. | |
| 2015/0228931 A1 | 8/2015 | Lamansky et al. | |
| 2015/0277031 A1 | 10/2015 | Bookbinder et al. | |
| 2015/0315061 A1 | 11/2015 | Hoover et al. | |
| 2016/0011365 A1 * | 1/2016 | Berkey ............ G02B 6/02014 385/127 |
| 2016/0109651 A1 | 4/2016 | Borel et al. | |
| 2016/0116660 A1 | 4/2016 | Benjamin et al. | |
| 2016/0197311 A1 | 7/2016 | Lamansky et al. | |
| 2016/0231503 A1 | 8/2016 | Sillard et al. | |
| 2016/0306107 A1 * | 10/2016 | Bickham ............ G02B 6/02395 | |
| 2016/0377801 A1 | 12/2016 | Bickham et al. | |
| 2017/0003445 A1 | 1/2017 | Bookbinder et al. | |

(56) References Cited

U.S. PATENT DOCUMENTS

| | | | |
|---|---|---|---|
| 2017/0075061 A1 | 3/2017 | Bookbinder et al. | |
| 2017/0097465 A1 | 4/2017 | Bookbinder et al. | |
| 2017/0160465 A1 | 6/2017 | Bookbinder et al. | |
| 2017/0242187 A1 | 8/2017 | Iida et al. | |
| 2017/0285260 A1 | 10/2017 | Bookbinder et al. | |
| 2017/0301888 A1 | 10/2017 | Lamansky et al. | |
| 2017/0307815 A1 | 10/2017 | Iwaguchi et al. | |
| 2017/0355874 A1 | 12/2017 | Uchida et al. | |
| 2018/0067256 A1 | 3/2018 | Bookbinder et al. | |
| 2018/0114949 A1 | 4/2018 | Ishikawa et al. | |
| 2018/0127593 A1 | 5/2018 | Chen et al. | |
| 2018/0128970 A1 | 5/2018 | Homma et al. | |
| 2018/0128971 A1* | 5/2018 | Bookbinder | C08F 222/1025 |
| 2018/0224607 A1 | 8/2018 | Bookbinder et al. | |
| 2018/0335565 A1 | 11/2018 | Bookbinder et al. | |
| 2019/0033515 A1 | 1/2019 | Sillard et al. | |
| 2019/0049681 A1* | 2/2019 | Bookbinder | G02B 6/0365 |
| 2019/0146150 A1 | 5/2019 | Konstadinidis et al. | |
| 2019/0170934 A1 | 6/2019 | Pastouret et al. | |
| 2019/0221780 A1 | 7/2019 | Ishikawa et al. | |
| 2019/0252365 A1 | 8/2019 | Chen et al. | |
| 2019/0331849 A1 | 10/2019 | Bennett et al. | |
| 2019/0331850 A1 | 10/2019 | Bennett et al. | |
| 2019/0346649 A1 | 11/2019 | Tanaka et al. | |
| 2019/0372055 A1 | 12/2019 | Wu et al. | |
| 2020/0049881 A1 | 2/2020 | Bookbinder et al. | |
| 2020/0064546 A1 | 2/2020 | Chien et al. | |
| 2020/0224037 A1 | 7/2020 | Chen et al. | |
| 2020/0225404 A1 | 7/2020 | Bickham et al. | |
| 2020/0271857 A1 | 8/2020 | Bickham et al. | |
| 2020/0271858 A1 | 8/2020 | Bickham et al. | |
| 2020/0313119 A1 | 10/2020 | Wang et al. | |
| 2020/0408997 A1 | 12/2020 | Arao et al. | |
| 2021/0143238 A1 | 5/2021 | Kim et al. | |
| 2021/0181408 A1 | 6/2021 | Bickham et al. | |
| 2021/0208335 A1 | 7/2021 | Abedijaberi et al. | |
| 2021/0223469 A1 | 7/2021 | Bickham et al. | |
| 2021/0231896 A1 | 7/2021 | Bickham et al. | |
| 2021/0234131 A1 | 7/2021 | Kuksenkov et al. | |
| 2021/0263215 A1 | 8/2021 | Bickham et al. | |
| 2021/0349257 A1 | 11/2021 | Fiacco et al. | |
| 2021/0356659 A1 | 11/2021 | Bennett et al. | |
| 2021/0356661 A1 | 11/2021 | Bennett et al. | |
| 2022/0043201 A1 | 2/2022 | Bickham et al. | |
| 2023/0101392 A1* | 3/2023 | Sakuma | G02B 6/0281 385/124 |
| 2023/0408760 A1* | 12/2023 | Bickham | C09D 133/14 |

OTHER PUBLICATIONS

Bickham et al; "Small Diameter Fiber Optic Cables Having Low-Friction Cable Jackets and Optical Fibers With Reduced Cladding and Coating Diameters" Filed as U.S. Appl. No. 62/738,174, filed Sep. 28, 2018; 69 Pages, Listed in ID as ID29091.

* cited by examiner

REDUCED COATING DIAMETER CHLORINE-DOPED SILICA OPTICAL FIBERS WITH LOW LOSS AND MICROBEND SENSITIVITY

This application is a divisional of U.S. patent application Ser. No. 17/146,881 which claims priority under 35 USC § 119(e) from U.S. Provisional Patent Application Ser. No. 62/962,600 filed on Jan. 17, 2020, both of which are incorporated by reference herein in their entireties.

BACKGROUND

Field

The present disclosure relates to optical fibers and in particular relates to reduced coating diameter chlorine-doped silica optical fibers with low loss and low microbending sensitivity.

Background

There is an increasing demand for optical fiber transmission capacity driven by the rapid growth of internet traffic. To increase the transmission capacity, wavelength division multiplexing and spatial division multiplexing have been used to increase the number of transmission channels and advanced modulation formats have been developed to increase the data rate per channel. However, the number of channels and the channel data rate are nearly at the practical limits and increasing the number of fibers is unavoidable. Therefore, coated optical fibers with reduced diameter are attractive for reducing the size of the cables, for reducing fiber/cable cost, and for efficient use of existing duct infrastructure. It is also attractive to have optical fibers that have low intrinsic loss and low microbending loss.

BRIEF SUMMARY

The present disclosure is directed to optical fiber cables having high transmission capacity, low transmission loss, and similar or smaller size compared to traditional cables or cables with higher fiber densities. Another aspect of the present disclosure is directed to optical fibers in the cables having small diameter, low transmission loss, low microbending loss, and high puncture resistance.

One aspect of the present disclosure provides an optical fiber, comprising: a glass fiber, the glass fiber including a core region and a cladding region surrounding and directly adjacent to the core region, the core region comprising silica glass doped with chlorine and having an outer radius $r_1$ in a range from 3.0 microns to 10.0 microns, the cladding region having an outer radius $r_4$ greater than or equal to 50.0 microns; a primary coating with an outer radius $r_5$ surrounding and directly adjacent to the cladding region, the primary coating having a thickness $(r_5-r_4)$ in a range from 5.0 microns to 25.0 microns and an in situ modulus less than 0.30 MPa; and a secondary coating with an outer radius $r_6$ less than or equal to 110 microns surrounding and directly adjacent to the primary coating, the secondary coating having a thickness $(r_6-r_5)$ in a range from 8.0 microns to 30.0 microns, a Young's modulus greater than 1500 MPa, and a normalized puncture load greater than $3.6\times10^{-3}$ g/micron$^2$; wherein the optical fiber has a 22-meter cable cutoff wavelength less than 1530 nm, an attenuation at 1550 nm of less than 0.17 dB/km, and a bending loss at 1550 nm, determined from a mandrel wrap test using a mandrel with a diameter of 20 mm, of less than 3.0 dB/turn.

In some embodiments, the core region has a step index relative refractive index profile with a relative refractive index $\Delta_1$ in a range from 0.08% to 0.50%.

In some embodiments, the core region has a graded index relative refractive index profile with a maximum relative refractive index $\Delta_{1max}$ in a range from 0.08% to 0.30%.

In some embodiments, the grade index relative refractive index profile is an α-profile with a value of α less than 10.

In some embodiments, the chlorine has a concentration in a range from 1.5 wt % to 7.0 wt %.

In some embodiments, the cladding region comprises pure silica or $SiO_2$ and has a relative refractive index $\Delta_4$ in a range from −0.05% to 0.05%.

In some embodiments, the cladding region comprises down-doped silica with a relative refractive index $\Delta_4$ in a range from −0.25% to 0.0%.

In some embodiments, the cladding region comprises: an inner cladding region surrounding and directly adjacent to the core region, the inner cladding region having an outer radius $r_2$ and a thickness $(r_2-r_1)$ in a range from 1 micron to 7 microns; and an outer cladding region surrounding and directly adjacent to the inner cladding region, the outer cladding region having an outer radius $r_4$ in a range from 50 microns to 70 microns; wherein a relative refractive index $\Delta_2$ of the inner cladding region is less than a relative refractive index $\Delta_4$ of the outer cladding region.

In some embodiments, the relative refractive index $\Delta_2$ is substantially zero; and the relative refractive index $\Delta_4$ is in a range from 0.05% to 0.30%.

In some embodiments, the relative refractive index $\Delta_2$ is in a range from −0.25% to 0.0%; and the relative refractive index $\Delta_4$ is substantially zero.

In some embodiments, the relative refractive index $\Delta_2$ is in a range from −0.25% to −0.0%; and the relative refractive index $\Delta_4$ is in a range from 0.05% to 0.30%.

In some embodiments, the cladding comprises: an inner cladding region surrounding and directly adjacent to the core, the inner cladding region having a thickness $(r_2-r_1)$ in a range from 1 micron to 7 microns; and a depressed index cladding region surrounding and directly adjacent to the inner cladding region, the depressed index cladding region having an outer radius $r_3$ in a range from 15 microns to 40 microns; an outer cladding region surrounding and directly adjacent to the depressed index cladding region, the outer cladding region having an outer radius $r_4$ in a range from 50 microns to 70 microns; wherein a relative refractive index $\Delta_3$ of the depressed index cladding region is less than a relative refractive index $\Delta_2$ of the inner cladding region and a relative refractive index $\Delta_4$ of the outer cladding region.

In some embodiments, the relative refractive index $\Delta_3$ is in a range from −0.25% to 0.0%.

In some embodiments, the relative refractive index $\Delta_2$ region is less than the relative refractive index $\Delta_4$.

In some embodiments, the outer radius $r_4$ is less than or equal to 125 microns; and the thickness $(r_6-r_5)$ is greater than 10 microns.

In some embodiments, the in situ modulus of the primary coating is less than or equal to 0.30 MPa; the Young's modulus of the secondary coating is larger than or equal to 1600 MPa; a diameter $2r_5$ of the primary coating is less than or equal to 190 microns; and a diameter $2r_6$ of the secondary coating is less than or equal to 230 microns.

In some embodiments, the in situ modulus of the primary coating is less than or equal to 0.20 MPa.

In some embodiments, the diameter $2r_5$ of the primary coating is less than or equal to 170 microns.

In some embodiments, the diameter $2r_5$ of the primary coating is less than or equal to 155 microns.

In some embodiments, the thickness ($r_5$-$r_4$) is in a range from 10.0 microns to 17.0 microns.

In some embodiments, the diameter $2r_6$ of the secondary coating is less than or equal to 210 microns.

In some embodiments, the diameter $2r_6$ of the secondary coating is less than or equal to 190 microns.

In some embodiments, the diameter $2r_6$ of the secondary coating is less than or equal to 170 microns.

In some embodiments, the thickness ($r_6$-$r_5$) is in a range from 8.0 microns to microns.

In some embodiments, the Young's modulus of the secondary coating is larger than or equal to 1900 MPa.

In some embodiments, the secondary coating has a normalized puncture load greater than $4.4 \times 10^{-3}$ g/micron$^2$.

In some embodiments, the secondary coating has a load transfer parameter $P_1/P$ less than 0.0178.

In some embodiments, the optical fiber has an attenuation less than or equal to dB/km at a wavelength of 1550 nm.

In some embodiments, the primary coating is a cured product of a coating composition comprising: a radiation-curable monomer; an adhesion promoter, the adhesion promoter comprising an alkoxysilane compound or a mercapto-functional silane compound; and an oligomer, the oligomer comprising: a polyether urethane acrylate compound having the molecular formula

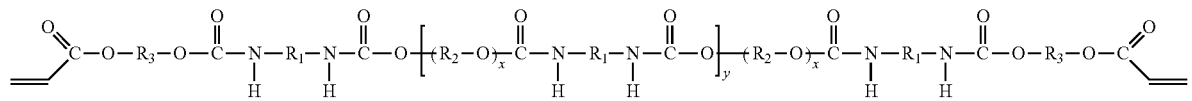

wherein $R_1$, $R_2$ and $R_3$ are independently selected from linear alkylene groups, branched alkylene groups, or cyclic alkylene groups; y is 1, 2, 3, or 4; and x is between 40 and 100; and a di-adduct compound having the molecular formula:

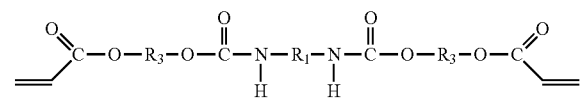

wherein the di-adduct compound is present in an amount of at least 1.0 wt % in the oligomer.

In some embodiments, the di-adduct compound is present in an amount of at least 3.5 wt % in the oligomer.

In some embodiments, the oligomer is the cured product of a reaction between: a diisocyanate compound; a hydroxy (meth)acrylate compound; and a polyol compound, said polyol compound having unsaturation less than 0.1 meq/g; wherein said diisocyanate compound, said hydroxy(meth)acrylate compound and said polyol compound are reacted in molar ratios n:m:p, respectively, wherein n is in the range from 3.0 to 5.0, m is within ±15% of 2n−4, and p is 2.

In some embodiments, the secondary coating is the cured product of a composition comprising: a first monomer, the first monomer comprising a first bisphenol A diacrylate compound.

In some embodiments, the coating composition further comprises a second monomer, the second monomer comprising a second bisphenol A diacrylate compound.

In some embodiments, the first bisphenol A diacrylate compound is an alkoxylated bisphenol A diacrylate compound and the second bisphenol A diacrylate compound is a bisphenol A epoxy diacrylate compound.

In some embodiments, the secondary coating is the cured product of a composition comprising: an alkoxylated bisphenol-A diacrylate monomer in an amount greater than 55 wt %, the alkoxylated bisphenol-A diacrylate monomer having a degree of alkoxylation in the range from 2 to 16; and a triacrylate monomer in an amount in the range from 2.0 wt % to 25 wt %, the triacrylate monomer comprising an alkoxylated trimethylolpropane triacrylate monomer having a degree of alkoxylation in the range from 2 to 16 or a tris[(acryloyloxy)alkyl]isocyanurate monomer.

In some embodiments, the alkoxylated bisphenol-A diacrylate monomer is present in an amount in the range from 60 wt % to 75 wt %.

In some embodiments, the triacrylate monomer is present in an amount in the range from 8.0 wt % to 15 wt %.

In some embodiments, the alkoxylated trimethylolpropane triacrylate monomer has a degree of alkoxylation in the range from 2 to 8.

In some embodiments, the alkoxylated trimethylolpropane triacrylate monomer is an ethoxylated trimethylolpropane triacrylate monomer.

In some embodiments, the tris[(acryloyloxy)alkyl]isocyanurate monomer is a tris(2-hydroxyethyl) isocyanurate triacrylate monomer.

In some embodiments, the composition further comprises a bisphenol-A epoxy diacrylate monomer in an amount in the range from 5.0 wt % to 20 wt %.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
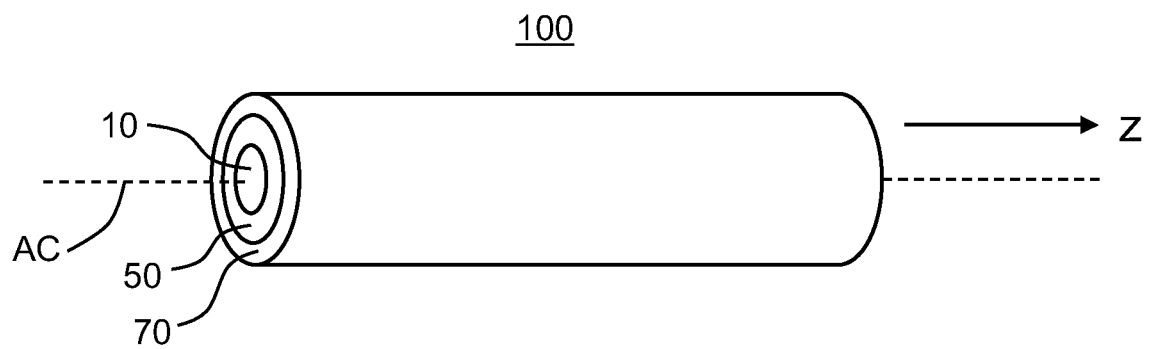
FIG. 1 is a side elevated view of a section of an exemplary optical fiber, according to some embodiments.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

Cartesian coordinates are used in some of the Figures for the sake of reference and ease of illustration and are not intended to be limiting as to direction or orientation. The z-direction is taken as the axial direction of the optical fiber.

The term "fiber" as used herein is shorthand for optical fiber.

The coordinate r is a radial coordinate, where r=0 corresponds to the centerline of the fiber. The term "radius" refers to a value of the radial coordinate. The term "outer radius", when used in reference to a region of a fiber, refers to the largest radial coordinate included in the region. The term "diameter", when used in reference to a region of a fiber, refers to twice the outer radius of the region.

The term "core" as used herein is a core region of an optical fiber, representing a cylinder of material, centered at r=0, that runs along the optical fiber's length. The core is characterized by its radius of cross-sectional area corresponding to confinement (e.g. 90%) of optical intensity in the optical fiber. The core is surrounded by a medium with a lower index of refraction, typically a cladding region. Light travelling in the core reflects from the core-cladding boundary due to total internal reflection, as long as the angle between the light and the boundary is greater than the critical angle. As a result, the optical fiber transmits all rays that enter the fiber with a sufficiently small angle relative to the optical fiber's axis.

The term "core radius" as used herein is referred to geometric core radius which is determined from the refractive index profile.

The symbol "μm" is used as shorthand for "micron," which is a micrometer, i.e., $1\times10^{-6}$ meter.

The symbol "nm" is used as shorthand for "nanometer," which is $1\times10^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

The phrase "bare optical fiber" or "bare fiber" as used herein means an optical fiber directly drawn from a heated glass source (i.e., a "preform") and prior to applying a protective coating layer to its outer surface (e.g., prior to the bare optical fiber being coated with a polymeric-based material).

"Refractive index" refers to the refractive index at a wavelength of 1550 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or parameter (e.g. $\Delta$ or $\Delta\%$) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value ($\Delta_{ave}$) of relative refractive index in the region as defined below, unless otherwise specified. Whether by design or a consequence of normal manufacturing variability, the dependence of relative refractive index on radial position may be sloped, curved, or otherwise non-constant.

The average relative refractive index ($\Delta_{ave}$) of a region of the fiber is determined from:

$$\Delta_{ave} = \int_{r_{inner}}^{r_{outer}} \frac{\Delta(r)dr}{(r_{outer} - r_{inner})}$$

where $r_{inner}$ is the inner radius of the region, router is the outer radius of the region, and $\Delta(r)$ is the relative refractive index of the region.

The "relative refractive index" as used herein is defined as:

$$\Delta(r)\% = 100\frac{n^2(r) - n_{SiO2}^2}{2n^2(r)}$$

where n(r) is the refractive index of the fiber at the radial distance r from the fiber's centerline AC (r=0) at a wavelength of 1550 nm, unless otherwise specified, and $n_{SiO2}$ is the index of the outer cladding at a wavelength of 1550 nm. In one example, when the outer cladding is essentially pure silica, $n_{SiO2}$=1.444 at a wavelength of 1550 nm.

In the description that follows, the relative refractive index (also referred herein as the "relative refractive index percent" for short) is represented by $\Delta$ (or "delta"), $\Delta\%$ (or "delta %"), or %, all of which can be used interchangeably, and its values are given in units of percent or %, unless otherwise specified. Relative refractive index is also expressed as $\Delta(r)$ or $\Delta(r)$ %.

In some embodiments, the bare optical fiber includes a region with a refractive index less than the reference index $n_{cl}$, which means that the relative refractive index percent of the region is negative. In other embodiments, the bare optical fiber includes a region with a refractive index greater than the reference index $n_{cl}$, which means that the relative refractive index percent of the region is positive. In some embodiments, the bare optical fiber includes a region with a negative relative refractive index percent and a region with a positive relative refractive index percent. The minimum relative refractive index of a region corresponds to the point in the region at which the relative refractive index is lowest. The maximum relative refractive index of a region corresponds to the point in the region at which the relative refractive index is greatest. Depending on the relative refractive index profile and on the region, each of the minimum relative refractive index and the maximum relative refractive index may be positive or negative.

In some embodiments, the term "dopant" refers to a substance that changes the relative refractive index of glass relative to pure un-doped $SiO_2$. In some embodiments, one or more other substances that are not updopants may be present in a region of an optical fiber (e.g., the core) having a positive relative refractive index $\Delta$. That is, in some embodiments, the core includes an updopant and a downdopant and has a net relative refractive index that is positive. In some embodiments, the dopants used to form the core of the optical fiber disclosed herein include $GeO_2$ (germania), $Al_2O_3$ (alumina), and the like. Dopants that increase the relative refractive index of glass relative to pure un-doped $SiO_2$ are referred to as up-dopants and dopants that decrease the relative refractive index of glass relative to pure un-doped $SiO_2$ are referred to as down-dopants. Glass that contains an up-dopant is said to be "up-doped" relative to pure un-doped $SiO_2$ and glass that contains a down-dopant is said to be "down-doped" relative to pure un-doped $SiO_2$. When the undoped glass is silica glass, updopants include Cl, Br, Ge, Al, P, Ti, Zr, Nb, Ta, and oxides thereof, and downdopants include F and B. When comparing two doped glasses (or two doped regions of a bare optical fiber), the doped glass (or glass region) having the higher relative refractive index is said to be up-doped relative to the doped glass (or glass region) having a lower relative refractive index and the doped glass (or glass region) having the lower relative refractive index is said to be down-doped relative to the doped glass (or glass region) having the higher relative refractive index. Glass regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different portions of a region.

In some embodiments, the relative refractive index of a region is an $\alpha$-profile defined by a parameter $\alpha$. The parameter $\alpha$ (also called the "profile parameter" or "alpha parameter") relates to the relative refractive $\Delta(r)$ of a region through the equation:

$$\Delta(r)=\Delta_0\{1-[(r-r_m)/(r_0-r_m)]^\alpha\}$$

where $r_m$ is the point where $\Delta(r)$ is the maximum $\Delta_0$, $r_0$ is the point at which $\Delta(r)$ reaches a minimum value and r is in the range $r_i$ to $r_f$, where $\Delta(r)$ is defined above, $r_i$ is the initial point of the $\alpha$-profile, $r_f$ is the final point of the $\alpha$-profile and $\alpha$ is an exponent that is a real number. In one example, $r_0$ is the point at which $\Delta(r)=0$. At low values of $\alpha$, the $\alpha$-profile is a graded index profile. As the value of $\alpha$ increases, the $\alpha$-profile more closely resembles a step index profile. For purposes of the present disclosure, an $\alpha$-profile with $\alpha>10$ is regarded as a step index relative refractive profile and an $\alpha$-profile with $\alpha<10$ is regarded as a graded relative refractive index profile.

The "trench volume" is denoted by $V_{Trench}$ and is defined as $$V_{Trench} = |2\int_{r_{Trench,inner}}^{r_{Trench,outer}} (\Delta_{Trench}(r) - \Delta_4) r \, dr|$$

where $r_{Trench,inner}$ is the inner radius of the trench region of the refractive index profile, $r_{Trench,outer}$ is the outer radius of the trench region of the refractive index profile, $\Delta_4$ is the relative refractive index of the outer cladding region that surrounds and is directly adjacent to the trench region, and $\Delta_{Trench}(r)$ is the relative refractive index of the trench, where $\Delta_{Trench}(r) < \Delta_4$ at all radial positions between $r_{Trench,inner}$ and $r_{Trench,outer}$. In one embodiment, the trench region is an inner cladding region and $r_{Trench,inner}$ is $r_1$, $r_{Trench,outer}$ is $r_2$, and $\Delta_{Trench}$ is $\Delta_2$. In another embodiment, the trench region is a depressed index cladding region and $r_{Trench,inner}$ is $r_2$, $r_{Trench,outer}$ is $r_3$, and $\Delta_{Trench}$ is $\Delta_3$. Trench volume is defined as an absolute value and has a positive value. Trench volume is expressed herein in units of % $\Delta$micron$^2$, % $\Delta$-micron$^2$, % $\Delta$-µm$^2$, or % $\Delta$µm$^2$, whereby these units can be used interchangeably herein.

The "mode field diameter" or "MFD" of an optical fiber is determined using the Peterman II method, which is the current international standard measurement technique for measuring the MFD of an optical fiber. The MFD is given by:

$$MFD = 2w$$

$$w = \left[ 2 \frac{\int_0^\infty (f(r))^2 r \, dr}{\int_0^\infty \left(\frac{df(r)}{dr}\right)^2 r \, dr} \right]^{1/2}$$

where f(r) is the transverse component of the electric field distribution of the guided optical signal and r is radial position in the fiber. The MFD depends on the wavelength of the optical signal and is reported for selected embodiments herein at wavelengths of 1310 nm and/or 1550 nm.

The "effective area" of an optical fiber is defined as:

$$A_{eff} = \frac{2\pi \left[ \int_0^\infty (f(r))^2 r \, dr \right]^2}{\int_0^\infty (f(r))^4 r \, dr}$$

where f(r) is the transverse component of the electric field of the guided optical signal and r is radial position in the fiber. In some embodiment, the effective area" or "$A_{eff}$" depends on the wavelength of the optical signal and is understood to refer to wavelengths of 1310 nm and 1550 nm as indicated herein.

The zero-dispersion wavelength is denoted $\lambda_0$ and is the wavelength for a single mode fiber at which material dispersion and waveguide dispersion cancel. In some embodiments, in silica-based optical fibers, the zero-dispersion wavelength is about 1310 nm, e.g., between 1300 nm and 1320 nm, depending on the dopants and refractive index profile used to form the optical fiber. Dispersion slope is the rate of change of dispersion with respect to wavelength. Dispersion and dispersion slope are reported for selected embodiments herein at a wavelength of 1310 nm and/or 1550 nm. Dispersion and dispersion slope are expressed in units of ps/nm-km and ps/nm$^2$-km, respectively.

The cutoff wavelength of an optical fiber is the minimum wavelength at which the optical fiber will support only one propagating mode. For wavelengths below the cutoff wavelength, multimode transmission may occur and an additional source of dispersion (intermodal dispersion) may arise to limit the fiber's information carrying capacity. Cutoff wavelength will be reported herein as a fiber cutoff wavelength ($\lambda_{CF}$) or a cable cutoff wavelength ($\lambda cc$). The 22-meter cable cutoff wavelength is typically less than the 2-meter cutoff wavelength due to higher levels of bending and mechanical pressure in the cable environment. The fiber cutoff wavelength $\lambda_{CF}$ is based on a 2-meter fiber length while the cable cutoff wavelength $\lambda_{CC}$ is based on a 22-meter cabled fiber length as specified in TIA-455-80: FOTP-80 IEC-60793-1-44 Optical Fibres—Part 1-44: Measurement Methods and Test Procedures—Cutoff Wavelength (21 May 2003), by Telecommunications Industry Association (TIA).

The optical fibers disclosed herein include a core region, a cladding region directly adjacent to and surrounding the core region, and a coating directly adjacent to and surrounding the cladding region. The cladding region is a single homogeneous region or multiple regions that differ in relative refractive index. The multiple cladding regions are preferably concentric regions.

In some embodiments, the cladding region includes an inner cladding region and an outer cladding region directly adjacent to and surrounding the inner cladding region. The relative refractive index of the inner cladding region may be greater than, equal to, or less than the relative refractive index of the outer cladding region. An inner cladding region having a lower refractive index than the outer cladding region is referred to herein as a trench or trench region.

In some embodiments, the cladding region includes a depressed index cladding region between and directly adjacent to an inner cladding region and an outer cladding region. The depressed index cladding region is a cladding region having a lower relative refractive index than the inner cladding and the outer cladding region. The depressed index cladding region may also be referred to herein as a trench or trench region. The depressed index cladding region surrounds and is directly adjacent to the inner cladding region. The depressed index cladding region is surrounded by and directly adjacent to an outer cladding region. The depressed index cladding region may contribute to a reduction in bending losses.

The core region, inner cladding region, depressed index cladding region, and outer cladding region are also referred to as core, inner cladding, depressed index cladding, and outer cladding, respectively. The inner cladding, depressed index cladding and outer cladding may independently have a positive or negative relative refractive index. The core preferably has a positive relative refractive index. Preferred values for relative refractive index for each of the regions are given below.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed index cladding region, radial position $r_4$ and relative refractive index $\Delta_4$ or $\Delta_4(r)$ refer to the outer cladding region, radial position $r_5$ refers to the primary coating, radial position $r_6$ refers to the secondary coating, and radial position $r_7$ refers to the optional tertiary coating. Radial position $r_4$ and relative refractive index $\Delta_4$ or $\Delta_4(r)$ will also be used to refer to the cladding region in embodiments that include a single cladding region instead of multiple cladding regions.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_3$ max and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that a surrounding inner cladding region, a surrounding depressed index cladding region, a surrounding outer cladding region, a surrounding primary coating, a surrounding secondary coating, and a surrounding tertiary coating are substantially annular in shape. Annular regions are characterized in terms of an inner radius and an outer radius. Radial positions $r_1$, $r_2$, $r_3$, $r_4$, $r_5$, $r_6$, and $r_7$ refer herein to the outermost radii of the core, inner cladding, depressed index cladding, outer cladding, primary coating, secondary coating, and tertiary coating, respectively. In embodiments having a single cladding instead of multiple cladding regions, $r_4$ refers to the outermost radius of the cladding. The radius $r_6$ corresponds to the outer radius of the optical fiber in embodiments without a tertiary coating. When a tertiary coating is present, the radius $r_7$ corresponds to the outer radius of the optical fiber.

When two regions are directly adjacent to each other, the outer radius of the inner of the two regions coincides with the inner radius of the outer of the two regions. In one embodiment, for example, the fiber includes a depressed index cladding region surrounded by and directly adjacent to an outer cladding region. In such an embodiment, the radius $r_3$ corresponds to the outer radius of the depressed index cladding region and the inner radius of the outer cladding region. In embodiments in which the relative refractive index profile includes a depressed index cladding region surrounding and directly adjacent to an inner cladding region, the radial position $r_2$ corresponds to the outer radius of the inner cladding region and the inner radius of the depressed index cladding region. In embodiments in which the relative refractive index profile includes a depressed index cladding region surrounding and directly adjacent to the core, the radial position $r_1$ corresponds to the outer radius of the core and the inner radius of the depressed index cladding region. In embodiments having a single cladding region surrounding and directly adjacent to the core, the radial position $r_1$ corresponds to the outer radius of the core and the inner radius of the cladding region.

The following terminology applies to embodiments in which the relative refractive index profile includes an inner cladding region surrounding and directly adjacent to the core, a depressed index cladding region surrounding and directly adjacent to the inner cladding region, an outer cladding region surrounding and directly adjacent to the depressed index cladding region, a primary coating surrounding and directly adjacent to the outer cladding region, and a secondary coating surrounding and directly adjacent to the primary coating. The difference between radial position $r_2$ and radial position $r_1$ is referred to herein as the thickness of the inner cladding region. The difference between radial position $r_3$ and radial position $r_2$ is referred to herein as the thickness of the depressed index cladding region. The difference between radial position $r_4$ and radial position $r_3$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating.

The following terminology applies to embodiments in which an inner cladding region is directly adjacent to a core region and an outer cladding region is directly adjacent the inner cladding region. The difference between radial position $r_2$ and radial position $r_1$ is referred to herein as the thickness of the inner cladding region. The difference between radial position $r_4$ and radial position $r_2$ is referred to herein as the thickness of the outer cladding region. The difference between radial position $r_5$ and radial position $r_4$ is referred to herein as the thickness of the primary coating. The difference between radial position $r_6$ and radial position $r_5$ is referred to herein as the thickness of the secondary coating.

The following terminology applies to embodiments in which the relative refractive index profile lacks both an inner cladding region and a depressed index cladding region. The difference between radial position $r_4$ and radial position $r_1$ is referred to herein as the thickness of the cladding region. The difference between radial position $r_5$ and radial position $r_4$ is referred to herein as the thickness of the primary coating. The difference between radial position $r_6$ and radial position $r_5$ is referred to herein as the thickness of the secondary coating.

The coatings described herein are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "molecular weight" when applied to polyols means number average molecular weight ($M_n$).

The term "(meth)acrylate" means methacrylate, acrylate, or a combination of methacrylate and acrylate.

Values of Young's modulus, % elongation, and tear strength refer to values as determined under the measurement conditions by the procedures described herein.

Reference will now be made in detail to illustrative embodiments of the present description.

The present description relates to curable coating compositions, coatings formed from the curable coating compositions, and coated articles coated or encapsulated by the coating obtained by curing the curable coating compositions. In a preferred embodiment, the curable coating composition is a composition for forming coatings for optical fibers, the coating is an optical fiber coating, and the coated article is a coated optical fiber. The present description also relates to methods of making curable coating compositions, methods of forming coatings from the curable coating compositions, and methods of coating fibers with the curable coating composition.

One aspect of the present disclosure relates to an optical fiber. FIG. 1 is a schematic elevated view of a section of an example optical fiber 100 according to some embodiments. In some embodiments, the optical fiber 100 has a centerline AC shown by way of example as running in the z-direction. The optical fiber 100 comprises a glass core region ("core") 10 that is centered on the centerline AC. The core 10 can be immediately is surrounded by and directly adjacent to a glass cladding region ("cladding") 50. The cladding 50 is surrounded by and directly adjacent to a protective coating 70 made of a non-glass material, such as a polymeric material. In some embodiments, the optical fiber 100 can have a diameter $r_6$ or $r_7$ of less than or equal to 230 microns (e.g., ≤210 microns, ≤200 microns, ≤180 microns, ≤165 microns, ≤130 microns, ≤110 microns, etc.).

Figure 2:
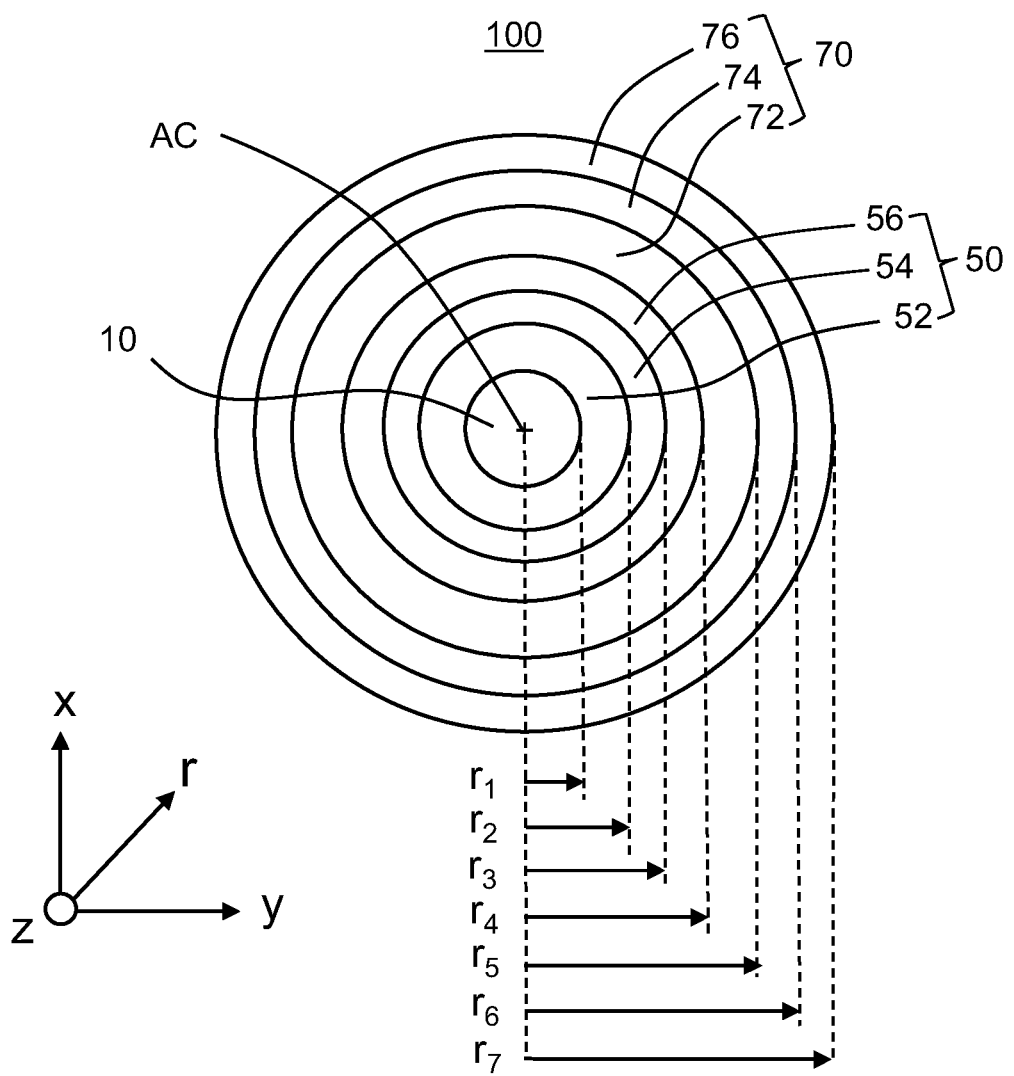
FIG. 2 is a cross-sectional view of an exemplary optical fiber, according to some embodiments.

Referring to FIG. 2, a cross-sectional view of an exemplary optical fiber 100 in x-y plane is shown in accordance with some embodiments of the present disclosure.

As illustrated, the core 10 has a radius $r_1$ and a relative refractive index $\Delta_1$. The cladding 50 can be directly adjacent to and surrounding the core 10. In some embodiments, the cladding 50 includes an inner cladding region ("inner cladding") 52 directly adjacent to and surrounding the core 10, a depressed index cladding region ("depressed index cladding") 54 directly adjacent to and surrounding the inner cladding 52, and an outer cladding region ("outer cladding") 56 directly adjacent to and surrounding the depressed index cladding 54. The inner cladding 52 extends from the radius $r_1$ to a radius $r_2$ and has a relative refractive index $\Delta_2$. The depressed index cladding 54 extends from the radius $r_2$ to a radius $r_3$ and has a relative refractive index $\Delta_3$. The outer cladding 56 extends from the radius $r_3$ to a radius $r_4$ and has a relative refractive index $\Delta_4$.

In some alternative embodiments not shown in the figures, the depressed index cladding 54 can be omitted. That is, the cladding 50 includes only two cladding regions. The inner cladding 52 can be directly adjacent to and surrounding the core 10, and extend from the radius $r_1$ to a radius $r_2$ and have a relative refractive index $\Delta_2$. The outer cladding 56 can be directly adjacent to and surrounding the inner cladding 52, and extend from the radius $r_2$ to a radius $r_4$ and have a relative refractive index $\Delta_4$.

In some other alternative embodiments not shown in the figures, the inner cladding 52 and the depressed index cladding 54 can be omitted. That is, the cladding 50 includes only one cladding region. The outer cladding 56 can be directly adjacent to and surrounding the core 10, and extend from the radius $r_1$ to a radius $r_4$ and have a relative refractive index $\Delta_4$.

Protective coating 70 is directly adjacent to and surrounds the cladding 50. In some embodiments, the protective coating 70 includes a primary coating 72 and a secondary coating 74. The primary coating 72 and the secondary coating 74 are typically formed by applying a curable coating composition to the glass fiber as a viscous liquid and curing. In some embodiments, the protective coating 70 may also include a tertiary coating 76 that surrounds the secondary coating 74.

The secondary coating 74 is a harder material (higher Young's modulus) than the primary coating 72 and is designed to protect the glass fiber from damage caused by abrasion or external forces that arise during processing, handling, and installation of the optical fiber. The primary coating 72 is a softer material (lower Young's modulus) than the secondary coating 74 and is designed to buffer or dissipates stresses that result from forces applied to the outer surface of the secondary coating 74.

The primary coating 72 dissipates shear forces and minimizes the stress that reaches the glass fiber (which includes the core 10 and the cladding 50). The primary coating 72 is especially important in dissipating shear forces that arise due to the microbends that the optical fiber encounters when deployed in a cable.

The primary coating 72 should maintain adequate adhesion to the glass fiber during thermal and hydrolytic aging, yet be strippable from the glass fiber for splicing purposes.

The optional tertiary coating 76 may include pigments, inks or other coloring agents to mark the optical fiber for identification purposes and typically has a Young's modulus similar to the Young's modulus of the secondary coating 74.

Figure 3:
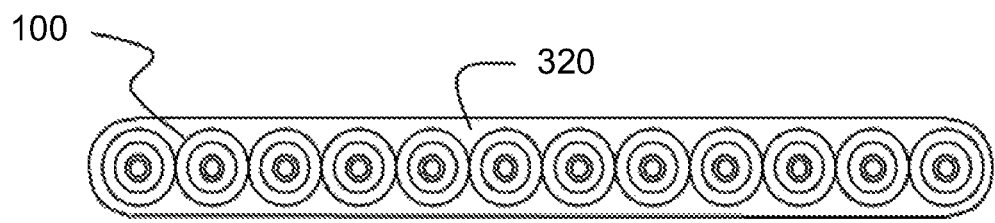
FIG. 3 is a schematic view of a representative optical fiber ribbon, according to some embodiments.

Another aspect of the present disclosure relates to an optical fiber ribbon. FIG. 3 illustrates a cross-sectional view of an exemplary optical fiber ribbon 300 in accordance with some embodiments of the present disclosure. As illustrated, the optical fiber ribbon 300 includes a plurality of optical fibers 100 and a matrix 320 encapsulating the plurality of optical fibers 100. Each optical fiber 100 includes a core, a cladding, and a protective coating as described above. The ribbon matrix 320 can be formed from the same composition used to prepare a secondary coating, or the ribbon matrix 320 can be formed from a different composition that is otherwise compatible for use.

The optical fibers 100 are aligned relative to one another in a substantially planar and parallel relationship. The optical fibers 100 in the optical fiber ribbon 300 are encapsulated by the ribbon matrix 320 in any suitable configuration (e.g., edge-bonded ribbon, thin-encapsulated ribbon, thick-encapsulated ribbon, or multi-layer ribbon) by any suitable fabricating methods. In FIG. 3, the fiber optic ribbon 300 contains twelve (12) optical fibers 100; however, it should be apparent to those skilled in the art that any number of optical fibers 100 (e.g., two or more) may be employed to form fiber optic ribbon 300 disposed for a particular use.

Figure 4:
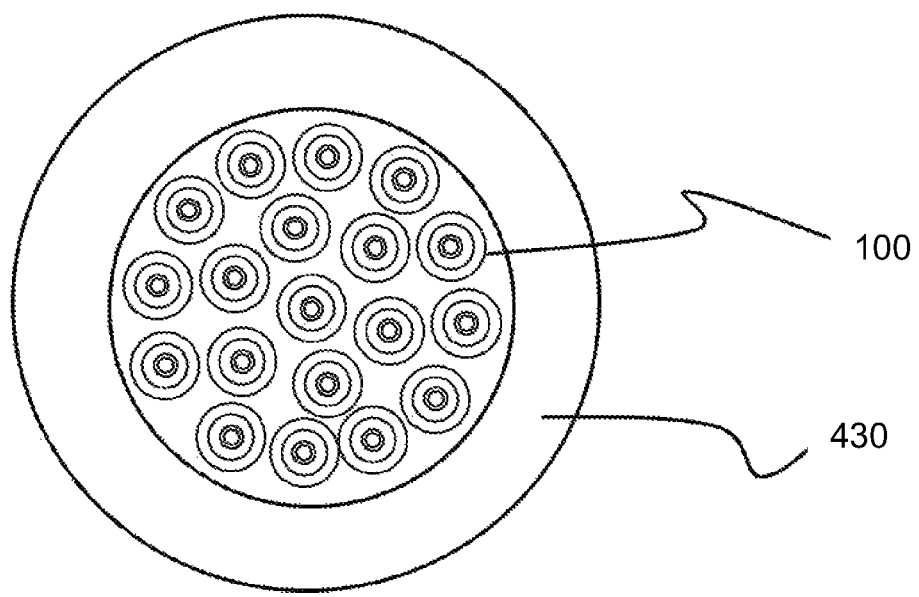
FIG. 4 is a schematic view of a representative optical fiber cable, according to some embodiments.

Another aspect of the present disclosure relates to an optical fiber cable. FIG. 4 illustrates a cross-sectional view of an exemplary optical fiber cable 400. Cable 400 includes a plurality of optical fibers 100 surrounded by jacket 430. Optical fibers 100 may be densely or loosely packed into a conduit enclosed by inner surface of jacket 430. The number of fibers placed in the jacket 430 is referred to as the "fiber count" of optical fiber cable 400. The jacket 430 is formed from an extruded polymer material and may include multiple concentric layers of polymers or other materials. Optical fiber cable 400 may include one or more strengthening members (not shown) embedded within jacket 430 or placed within the conduit defined by the inner surface of jacket 430. Strengthening members include fibers or rods that are more rigid than jacket 430. The strengthening member is made from metal, braided steel, glass-reinforced plastic, fiberglass, or other suitable material. Optical fiber cable 400 may include other layers surrounded by jacket 430 (e.g. armor layers, moisture barrier layers, rip cords, etc.). Optical fiber cable 400 may have a stranded, loose tube core or other fiber optic cable construction.

Relative Refractive Index Profiles

In some embodiments, the optical fiber 100 can have a number of different physical configurations defined by way of example as a relative refractive index profile. One type of the disclosed optical fiber is a graded-index fiber, which has a core region with a refractive index that varies with distance from the fiber center. Examples of graded-index fibers include fibers having a core with a relative refractive index having an α-profile defined above or a super-Gaussian relative refractive index profile. Examples of the graded-index fibers are set forth below in connection with FIGS. 5A-5C. Another type of the disclosed optical fiber is a step-index fiber, which has a core region with a step index relative refractive index profile. Examples of the step-index fibers are set forth below in connection with FIGS. 6A-6E.

Figure 5A:
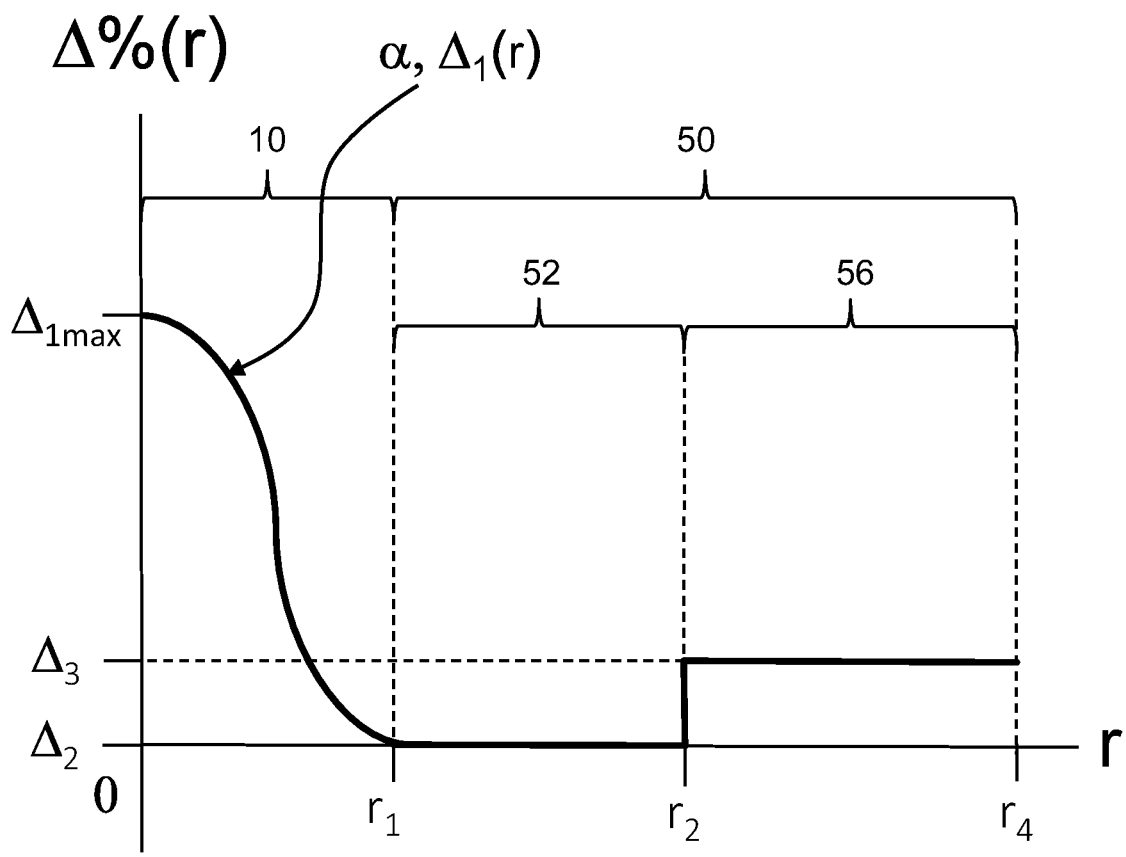
FIGS. 5A through 5C are exemplary relative refractive index profiles of an optical fiber, according to some embodiments.

Referring to FIG. 5A, a plot of the relative refractive index Δ% (r) versus the radial coordinate illustrating a first exemplary physical configuration of a graded-index fiber, according to some embodiments. As shown, the core 10 having a radius $r_1$ can have a graded refractive index defined by described by an α-profile. The radial position $r_0$ (corresponding to $\Delta_{1max}$) of the α-profile corresponds to the centerline AC (r=0) of the fiber and the radial position $r_z$ of the α-profile corresponds to the core radius $r_1$. In some embodiments with a centerline dip, the radial position $r_0$ is slightly offset from the centerline AC of the fiber.

In some embodiments, the core 10 is immediately surrounded by the cladding 50 that extends from the radius $r_1$ out to a radius $r_4$. The cladding 50 can include an inner cladding region 52 and an outer cladding region 56 surrounding the inner cladding region 52. The inner cladding region 52 can be a pure silica cladding or a cladding comprised essentially of $SiO_2$ extending from the radius $r_1$ to a radius $r_2$ and having a relative refractive index $\Delta_2$ that is substantially zero. The outer cladding region 54 can be an up-doped cladding extending from the radius $r_2$ to the radius $r_4$, and having a relative refractive index $\Delta_4$, wherein $\Delta_2 \leq \Delta_4 \leq \Delta_{1max}$.

Figure 5B:
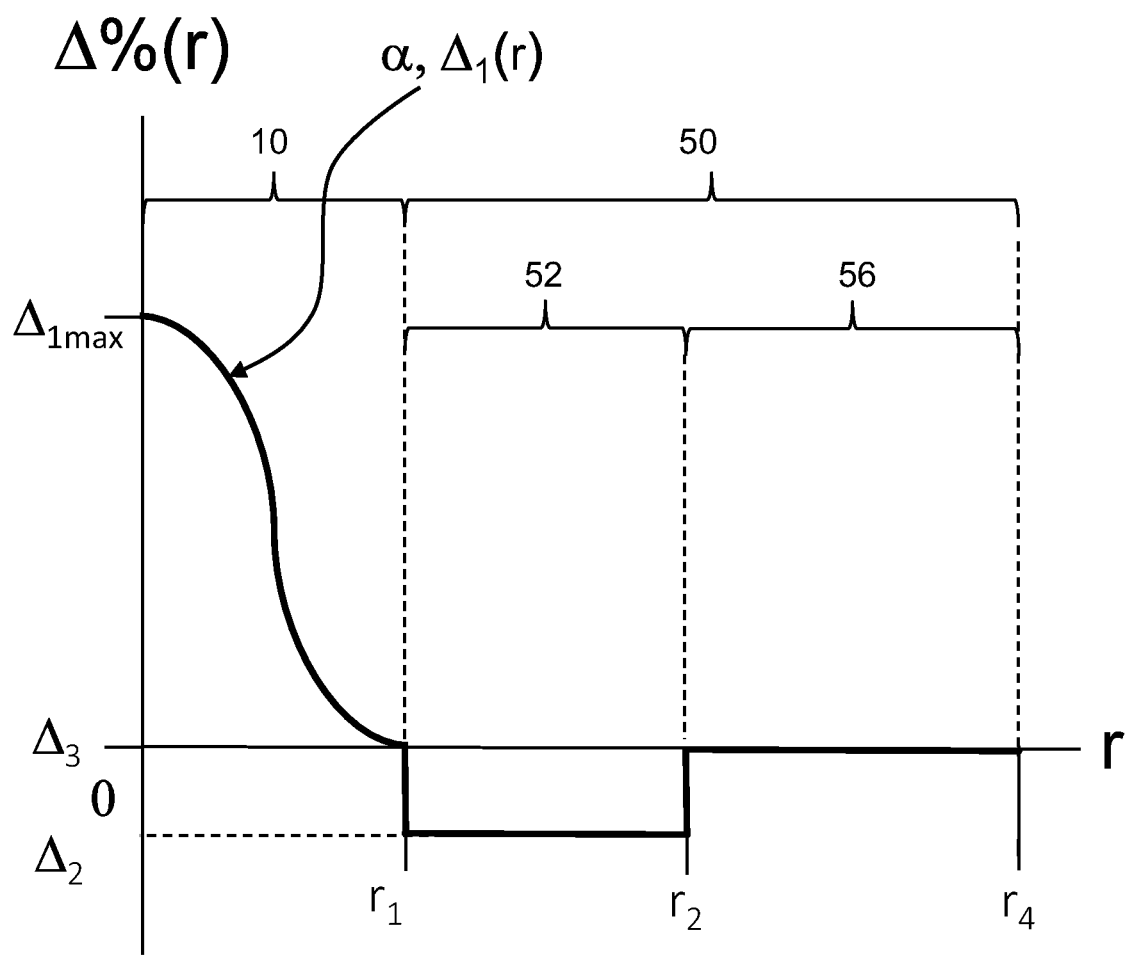

FIG. 5B is a plot of the relative refractive index Δ% (r) versus the radial coordinate illustrating a second exemplary physical configuration of a graded-index fiber, according to some embodiments. The core 10 having a radius $r_1$ can have a graded refractive index defined by described by an α-profile. The core 10 is immediately surrounded by the cladding 50 that extends from the radius $r_1$ out to a radius $r_4$. The cladding 50 includes an inner cladding region 52 and an outer cladding region 56 surrounding the inner cladding region 52. The inner cladding region 52 can be a down-doped cladding extending from the radius $r_1$ to a radius $r_2$ and having a negative relative refractive index $\Delta_2$. The outer cladding region 54 can be a pure silica cladding or a cladding comprised essentially of $SiO_2$ extending from the radius $r_2$ to the radius $r_4$, and having a relative refractive index $\Delta_4$ that is substantially zero.

Figure 5C:
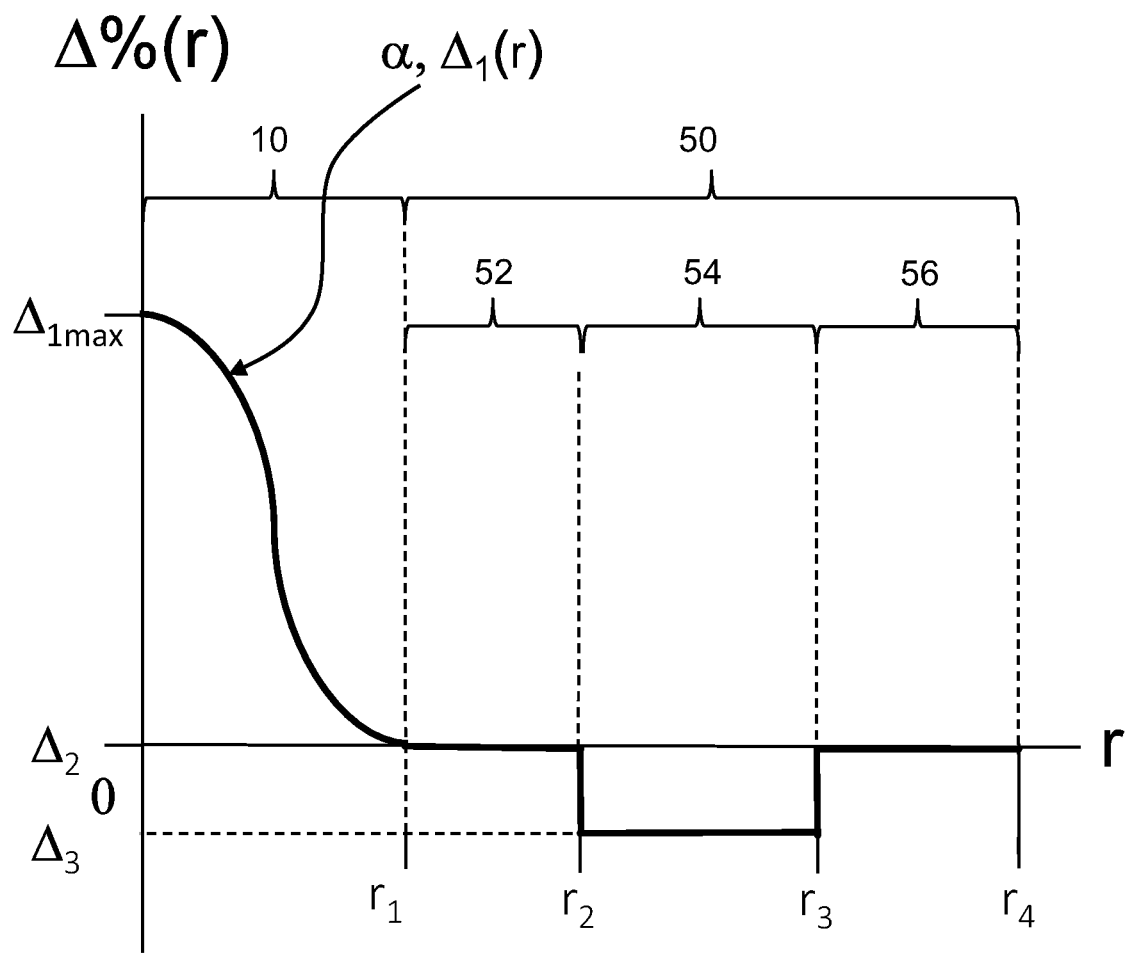

FIG. 5C is a plot of the relative refractive index Δ% (r) versus the radial coordinate illustrating a third exemplary physical configuration of a graded-index fiber, according to some embodiments. The core 10 having a radius $r_1$ can have a graded refractive index defined by described by an α-profile. The core 10 is immediately surrounded by the cladding 50 that extends from the radius $r_1$ out to a radius $r_4$. The cladding 50 includes an inner cladding region 52, a depressed index cladding 54 directly adjacent to and surrounding the inner cladding 52, and an outer cladding region 56 surrounding the inner cladding region 52. The inner cladding region 52 can be a pure silica cladding or a cladding comprised essentially of $SiO_2$ extending from the radius $r_1$ to a radius $r_2$ and having a negative relative refractive index $\Delta_2$. The depressed index cladding 54 can be a down-doped cladding extending from the radius $r_2$ to a radius $r_3$ and having a negative relative refractive index $\Delta_3$. The outer cladding region 54 can be a pure silica cladding or a cladding comprised essentially of $SiO_2$ extending from the radius $r_3$ to the radius $r_4$, and having a relative refractive index $\Delta_4$ that is substantially zero.

Figure 6A:
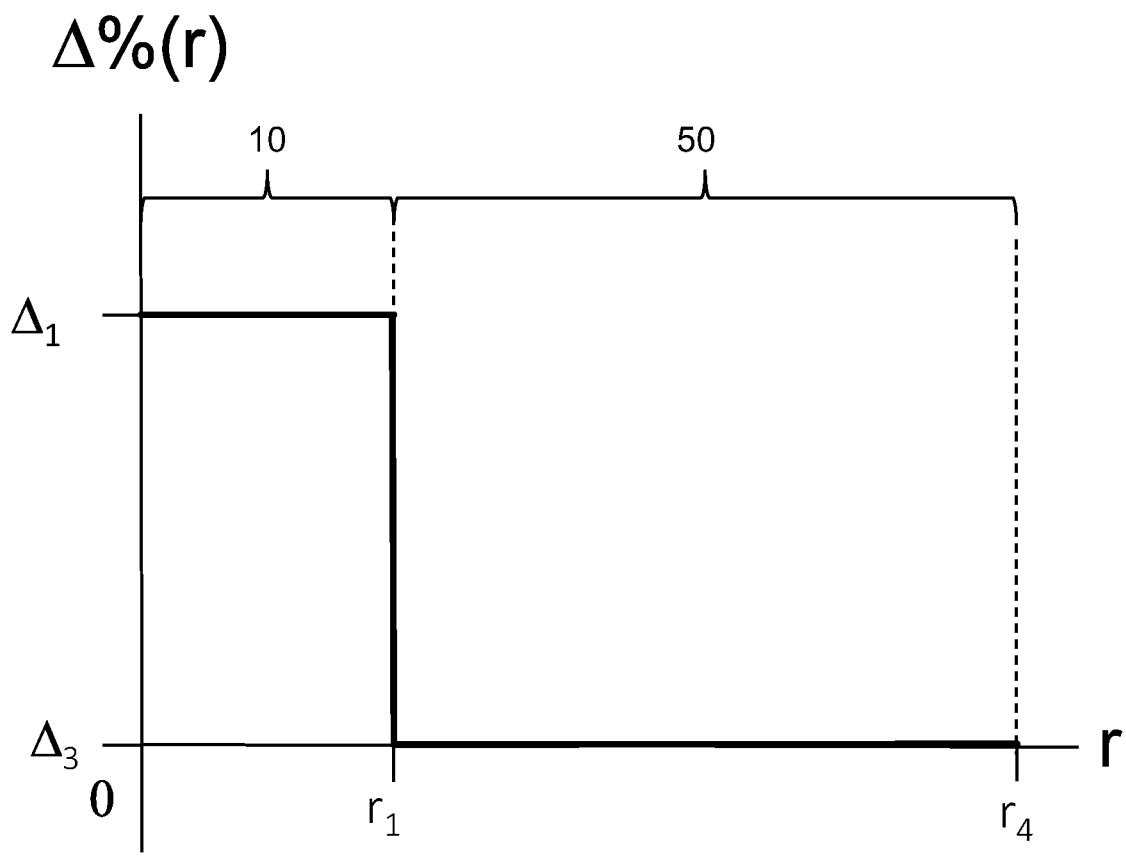
FIGS. 6A through 6E are exemplary relative refractive index profiles of an optical fiber, according to some embodiments.

Referring to FIG. 6A, a first exemplary physical configuration of a step-index fiber is illustrated in the form of a plot of the relative refractive index Δ% (r) versus the radial coordinate r, according to some embodiments. As shown, the core 10 can be a step refractive index core having a radius $r_1$ and a relative refractive index $\Delta_1$. The core 10 is immediately surrounded by the cladding 50. The cladding 50 can be a pure silica cladding or a cladding comprised essentially of $SiO_2$. The cladding 50 can extend from the radius $r_1$ out to a radius $r_4$ and having a relative refractive index $\Delta_4$ that is substantially zero.

Figure 6B:
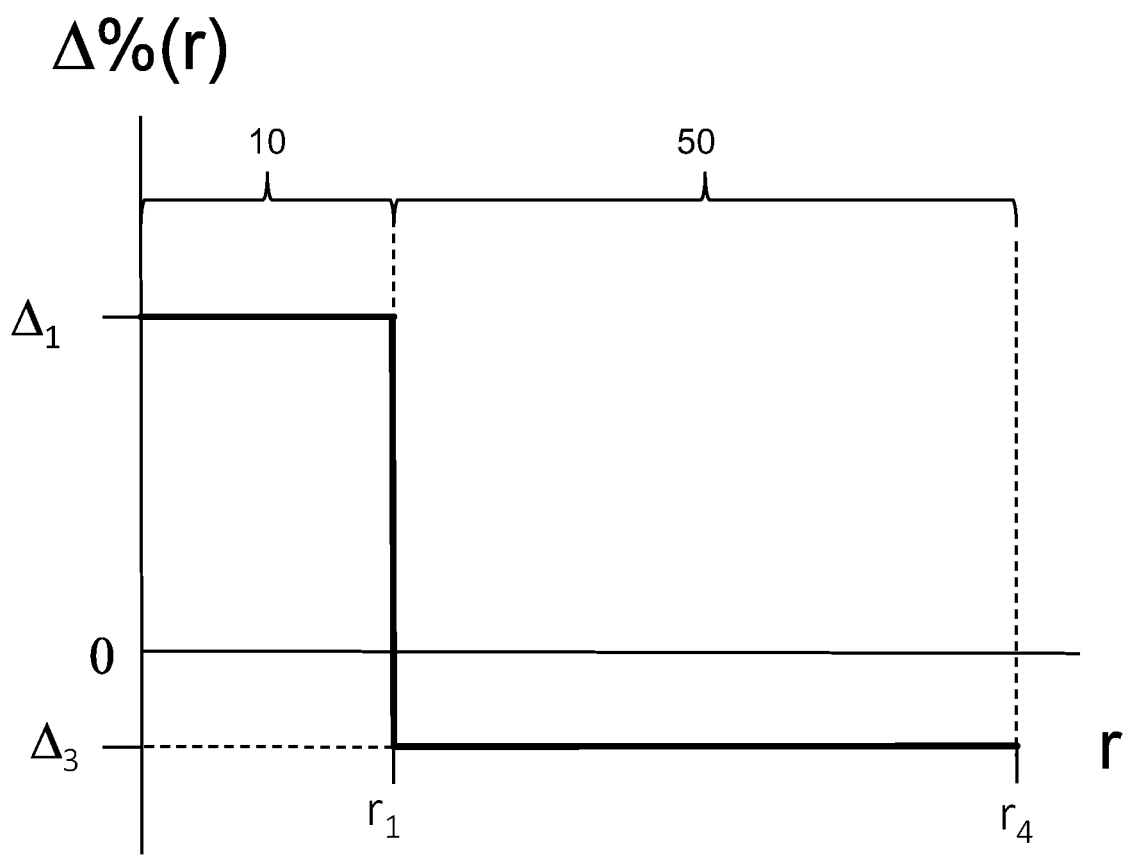

FIG. 6B is another plot of the relative refractive index Δ% (r) versus the radial coordinate illustrating a second exemplary physical configuration of a step-index fiber, according to some embodiments. Similarly, the core 10 can be a step refractive index core having a radius $r_1$ and a relative refractive index $\Delta_1$. The core 10 is immediately surrounded by the cladding 50 that extends from the radius $r_1$ out to a radius $r_4$. The cladding 50 can be down-doped with a negative relative refractive index $\Delta_4$.

Figure 6C:
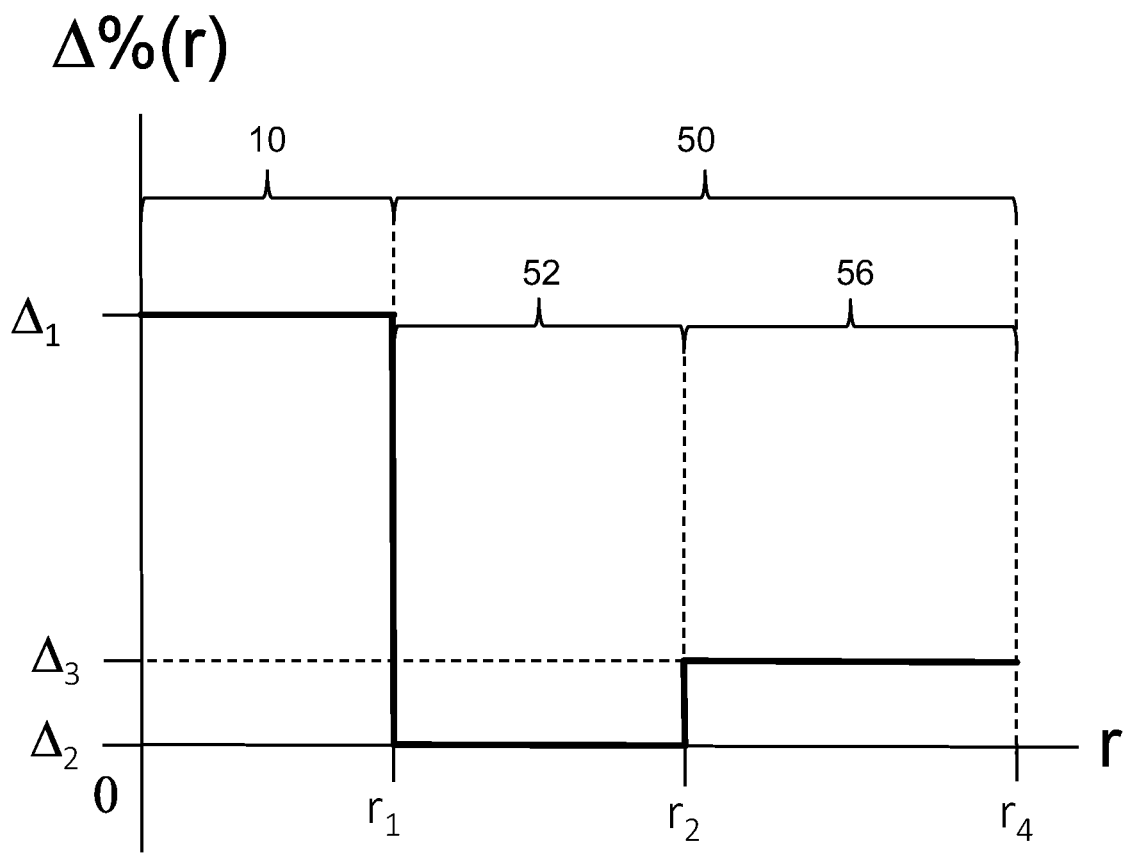

FIG. 6C is another plot of the relative refractive index Δ% (r) versus the radial coordinate illustrating a third exemplary physical configuration of a step-index fiber, according to some embodiments. The core 10 can be a step refractive index core having a radius $r_1$ and a relative refractive index $\Delta_1$. The core 10 is immediately surrounded by the cladding 50 that extends from the radius $r_1$ out to a radius $r_4$. The cladding 50 can include an inner cladding region 52 and an outer cladding region 56 surrounding the inner cladding region 52. The inner cladding region 52 can be a pure silica cladding or a cladding comprised essentially of $SiO_2$ extending from the radius $r_1$ to a radius $r_2$ and having a relative refractive index $\Delta_2$ that is substantially zero. The outer cladding region 56 can be an up-doped cladding extending from the radius $r_2$ to the radius $r_4$, and having a relative refractive index $\Delta_4$, wherein $\Delta_2 \leq \Delta_4 \leq \Delta_1$.

Figure 6D:
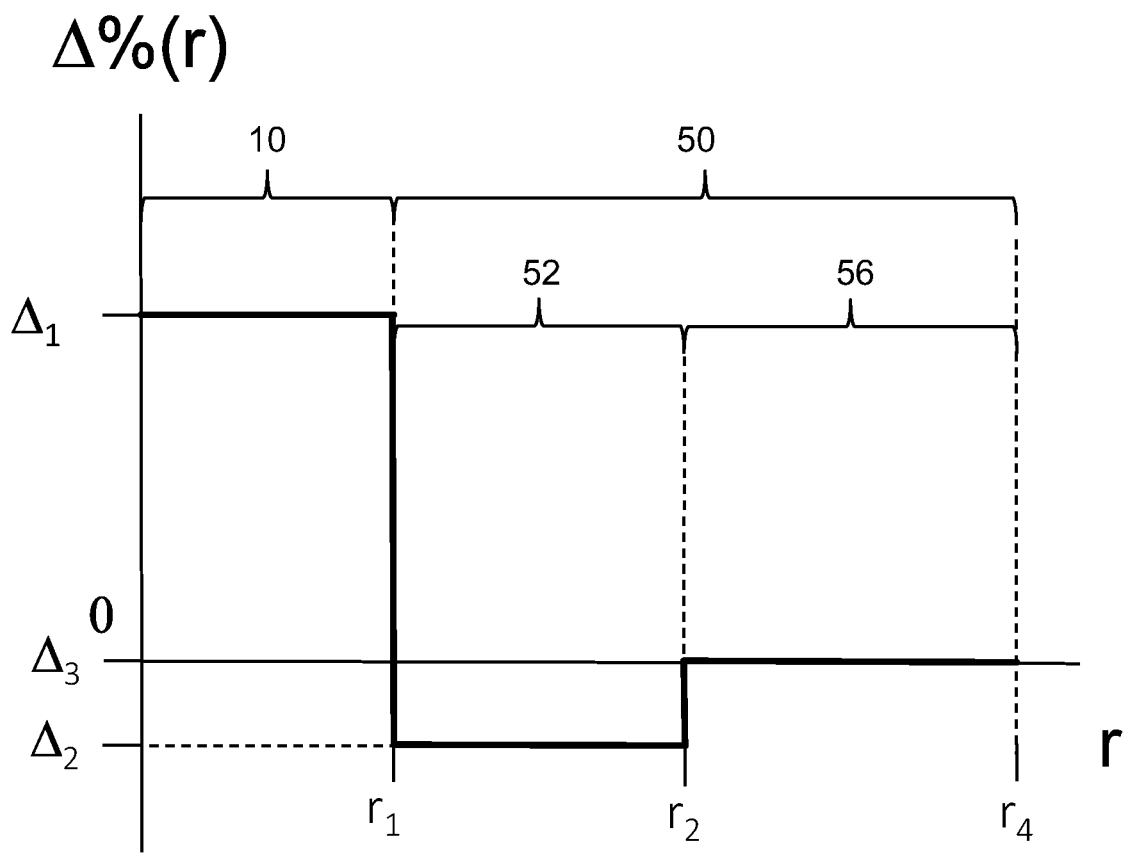

FIG. 6D is another plot of the relative refractive index $\Delta\%$ (r) versus the radial coordinate illustrating a fourth exemplary physical configuration of a step-index fiber, according to some embodiments. The core 10 can be a step refractive index core having a radius $r_1$ and a relative refractive index $\Delta_1$. The core 10 is immediately surrounded by the cladding 50 that extends from the radius $r_1$ out to a radius $r_4$. The cladding 50 can include an inner cladding region 52 and an outer cladding region 56 surrounding the inner cladding region 52. The inner cladding region 52 can be a down-doped cladding with a negative relative refractive index $\Delta_2$. The outer cladding region 56 can be a pure silica cladding or a cladding comprised essentially of $SiO_2$ extending from the radius $r_2$ to the radius $r_4$, and having a relative refractive index $\Delta_4$ that is substantially zero.

Figure 6E:
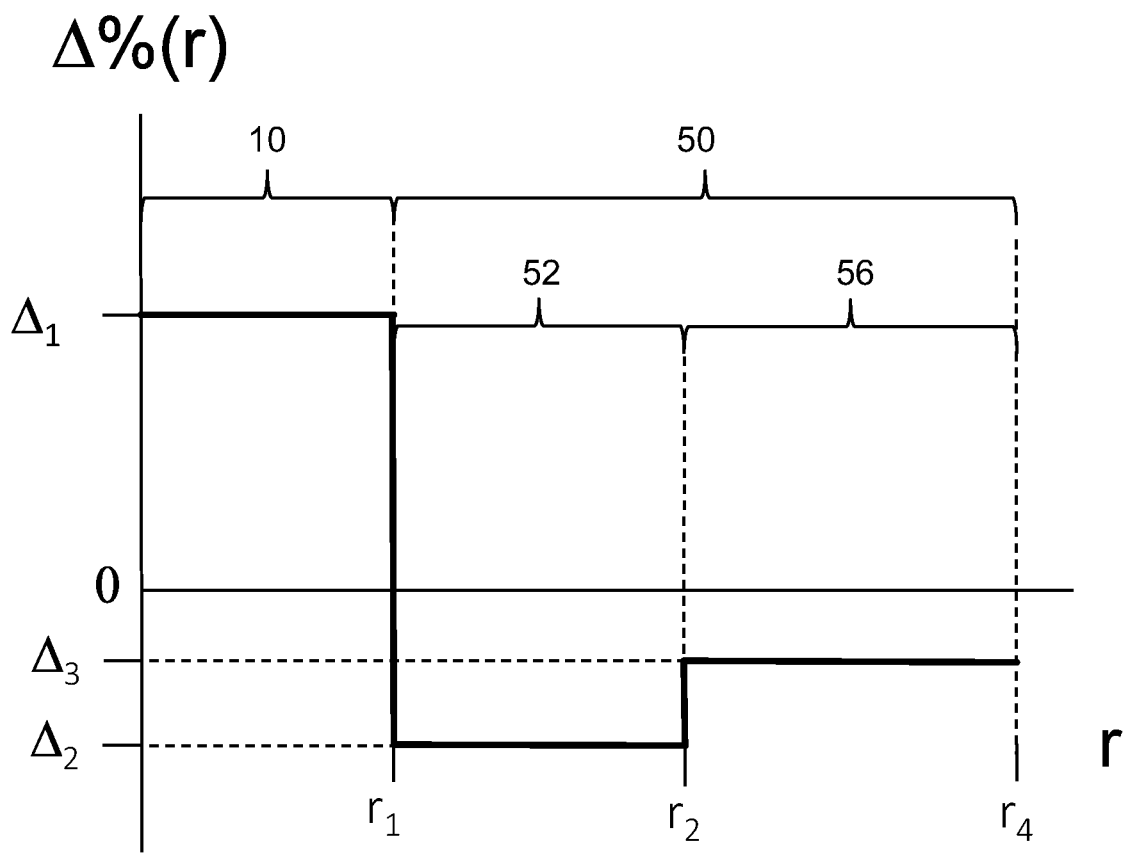

FIG. 6E is another plot of the relative refractive index $\Delta\%$ (r) versus the radial coordinate illustrating a fifth exemplary physical configuration of a step-index fiber, according to some embodiments. The core 10 can be a step refractive index core having a radius $r_1$ and a relative refractive index $\Delta_1$. The core 10 is immediately surrounded by the cladding 50 that extends from the radius $r_1$ out to a radius $r_4$. The cladding 50 can include an inner cladding region 52 and an outer cladding region 56 surrounding the inner cladding region 52. The inner cladding region 52 can be a down-doped cladding with a negative relative refractive index $\Delta_2$. The outer cladding region 56 can be a lightly down-doped cladding with a negative relative refractive 44 larger than 42, wherein $\Delta_{2 \leq 44} < \Delta_1$.

In other embodiments (not illustrated), a fiber with a step-index relative refractive index profile for the core has a cladding that includes an inner cladding region surrounded by a depressed-index cladding region, which is surrounded by an outer cladding region. For example, any of the step-index profiles depicted in FIGS. 6C-6E can be modified to include a depressed-index cladding region 54 between the inner cladding region 52 and the outer cladding region 54 (see, for example, the cladding region 50 shown in FIG. 5C).

It is to be understood that, in the above FIGS. 5A-5C and FIGS. 6A-6E, the relative refractive index transitions between adjacent regions shown as step changes are idealization for illustrative purpose and may not be strictly vertical in practice. Instead, the relative refractive index transitions between adjacent regions may have a slope or curvature. When the relative refractive index transitions between adjacent regions are non-vertical, the corresponding boundaries (radius) between adjacent regions are defined by the mid-points of the relative refractive index transition regions between the adjacent regions.

Parameter Specifications of Properties

In some embodiments, various fiber parameters described herein can be properly designed to increase transmission capacity, puncture resistance and microbending performance. In the following, details of various designs of the fiber parameters are described below. It is noted that, the following numerical values for fiber parameters can be applied to fibers with either step index cores or graded index cores described, for example, above in connection with FIGS. 5A-5C and 6A-6E.

In various embodiments, the outer radius $r_1$ of the core is in a range from 3.0 microns to 10.0 microns, or in a range from 4.0 microns to 9.0 microns, or in a range from 5.0 microns to 8.0 microns, or in a range from 5.0 microns to 9.0 microns, or in a range from 6.0 microns to 9.0 microns. In some embodiments, the relative refractive index of the core is described by a step-index profile having a constant or approximately constant value corresponding to $\Delta_1$ in a range from 0.08% to 0.450%, or in a range from 0.10% to 0.40%, or in a range from 0.12% to 0.35%, or in a range from 0.14% to 0.30%. In some other embodiments, the relative refractive index of the core is described by an α-profile with an cc value in a range from 1 to 200, or in a range from 5 to 150, or in a range from 10 to 100, or in a range from 5 to or greater than 5, or greater than 10, or greater than 20, or less than 20, or less than 10, or less than 5. The corresponding maximum relative refractive index $\Delta_{1max}$ of the core region is in a range from 0.08% to 0.45%, or in a range from 0.10% to 0.40%, or in a range from 0.12% to or in a range from 0.14% to 0.30%. In some embodiments, the core can be doped with chlorine ("Cl-doped" hereinafter), with the chlorine concentration in a range from 1.5 wt % to 6.0 wt %, or in a range from 2.0 wt % to 5.5 wt %, or in a range from 2.5 wt % to 5.0 wt %, or in a range from 3.0 wt % to 4.5 wt %, or greater than or equal to 1.5 wt % (e.g., ≥2 wt %, ≥2.5 wt %, ≥3 wt %, ≥3.5 wt %, ≥4 wt %, ≥4.5 wt %, ≥5 wt %, etc.) It is noted that, the notation "wt %" used herein means a weight percentage. It is also noted that, the core is $GeO_2$ free, or a concentration of $GeO_2$ in the cores is less than 1.0 wt %.

In various embodiments, a thickness $(r_2-r_1)$ of the inner cladding is in a range from 1.0 microns to 7.0 microns, or in a range from 2.0 microns to 6.0 microns, or in a range from 3.0 microns to 5.5 microns, or in a range from 3.5 microns to 5.0 microns. The relative refractive index $\Delta_2$ of the inner cladding is in a range from −0.15% to 0.15%, or in a range from −0.10% to 0.10%, or in a range from −0.05 to 0.05%, or in a range from −0.15% to 0.0%, or in a range from −0.10% to 0.0%. In some embodiments, the inner cladding is downdoped. For example, the inner cladding can be doped with fluorine ("F-doped" hereinafter) with a fluorine concentration in a range from 0.01 wt % to 0.20 wt %, or in a range from 0.05 wt % to 0.15 wt %. In some other embodiments, the inner cladding is updoped. For example, the inner cladding can be Cl-doped with a chlorine concentration in a range from 0.01 wt % to 0.50 wt %, or in a range from 0.05 wt % to 0.40 wt %, or in a range from 0.10 wt % to 0.30 wt %.

The inner radius of the depressed index cladding region is $r_2$ and has the values specified above. In various embodiments, the outer radius $r_3$ of the depressed index cladding is in a range from 15 microns to 40 microns, or in a range from 18 microns to 37 microns, or in a range from 20 microns to 35 microns, or in a range from 22 microns to 30 microns. The relative refractive index $\Delta_3$ of the depressed index cladding is in a range from −0.25% to 0.00%, or in a range from −0.20% to −0.05%, or in a range from −0.20 to −0.10. As described above, the depressed index cladding is down-doped, such as being F-doped with a fluorine concentration in a range from 0.10 wt % to 0.50 wt %, or in a range from 0.15 wt % to 0.45 wt %, or in a range from wt % to 0.40 wt %, or greater than 0.10 wt %, or greater than 0.15 wt %, or greater than 0.20 wt %. A trench volume of the depressed index cladding is greater than 40% $\Delta$-micron$^2$, greater than 50% $\Delta$-micron$^2$, greater than 60% $\Delta$-micron$^2$, greater than 70% $\Delta$-micron$^2$ or in a range from 40% $\Delta$-micron to 80% $\Delta$-micron$^2$, or in a range from 50% $\Delta$-micron$^2$ to 70% $\Delta$-micron$^2$. It is noted that, in some embodiments, the cladding includes only the inner cladding and outer cladding without the intervening depressed index cladding, as described above in connection with FIGS. 5A-5B and 6C-6E, the inner cladding functions as a depressed index cladding.

The inner radius of the outer cladding region is $r_3$ and has the values specified above. In various embodiments, the outer radius $r_4$ of the outer cladding is greater than 50 microns, or greater than 55 microns, or greater than 60 microns, or in a range from 50 microns to microns, or in a range from 55 microns to 65 microns, or in a range from 57 microns to 64 microns, or about 62.5 microns. The relative refractive index $\Delta_4$ of the outer cladding is in a range from −0.20% to 0.10%, or in a range from −0.15% to 0.10%, or in a range from −0.10 to or in a range from −0.05% to 0.05%. In some embodiments, the outer cladding is downdoped, such as being F-doped with a fluorine concentration in a range from 0.05 wt % to wt %, or in a range from 0.10 wt % to 0.25 wt %. In some other embodiments, the outer cladding is updoped, such as Cl-doped with a chlorine concentration in a range from 0.10 wt % to wt %, or in a range from 0.20 wt % to 0.50 wt %.

The mode field diameter of the optical fibers disclosed herein is greater than or equal to 10.0 microns, or greater than or equal to 11.0 microns, or greater than or equal to 11.5 microns, or greater than or equal to 12.0 microns, greater than or equal to 13.0 microns, or greater than or equal to 14.0 microns, or in a range from 10.0 microns to 15 microns, or in a range from 11.0 microns to 14.0 microns at a wavelength of 1550 nm.

The effective area $\Delta_{eff}$ of the optical fibers disclosed herein is greater than 100 micron$^2$, or greater than 110 micron$^2$, or greater than 120 micron$^2$, or greater than 130 micron$^2$, or greater than 140 micron$^2$, or greater than 150 micron$^2$, or in the range from 100 micron$^2$ to 160 micron$^2$, or in the range from 110 micron$^2$ to 150 micron$^2$, or in the range from 120 micron$^2$ to 140 micron$^2$ at a wavelength of 1550 nm.

The attenuation of the optical fibers disclosed herein is less than or equal to 0.170 dB/km, or less than or equal to 0.165 dB/km, or less than or equal to 0.160 dB/km, or less than or equal to 0.155 dB/km, or less than or equal to 0.150 dB/km at a wavelength of 1550 nm.

It is noted that, macrobending loss can be determined using a mandrel wrap test specified in standard IEC 60793-1-47. In the mandrel wrap test, the optical fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the optical fiber about the mandrel. Macrobending losses at a wavelength of 1550 nm were determined for selected examples described below with the mandrel wrap test using mandrels with diameters of ranging from 10 mm to 60 mm. In some embodiments, the bending loss of the optical fibers at a wavelength of 1550 nm as determined by the mandrel wrap test using a mandrel having a diameter of 20 mm can be less than 3.0 dB/turn, or less than 2.5 dB/turn, or less than 2.0 dB/turn, or less than 1.5 dB/turn, or less than 1.0 dB/turn.

In some embodiments, the fiber cutoff wavelength $\lambda_{CF}$ of the optical fibers disclosed herein is less than 1530 nm, or less than 1520 nm, or less than 1500 nm, or less than 1450 nm, or less than 1400 nm, or less than 1350 nm, less than 1300 nm, or less than 1260 nm. The 22-meter cable cutoff $\lambda_{CC}$ (nm) of the optical fibers disclosed herein is less than 1530 nm, or less than 1515 nm, or less than 1490 nm, or less than 1450 nm, or less than 1400 nm, or less than 1350 nm, less than 1300 nm, or less than 1260 nm, or less than 1230 nm, or less than 1220 nm.

In some embodiments the puncture resistance of the optical fiber 100 can be greater than 30 g (e.g., >40 g, >50 g, etc.).

In some embodiments, proper combination of the fiber parameters in the ranges described above can result in optical fiber properties that meet the requirements of a high transmission capacity, a small diameter, a low transmission loss, good microbending properties, and high puncture resistance. The profiles designs shown in FIGS. 5A to 5C and 6A to 6E, and the various fiber parameters described above can be compliant with various optical fibers, such as ITU G.652.D, G.657.A1, G.657.A2, G.654, etc.

Optical Fiber Coatings. The transmissivity of light through an optical fiber is highly dependent on the properties of the coatings applied to the glass fiber. The coatings typically include a primary coating and a secondary coating, where the secondary coating surrounds the primary coating and the primary coating contacts the glass fiber (which includes a central core region surrounded by a cladding region). The secondary coating is a harder material (higher Young's modulus) than the primary coating and is designed to protect the glass fiber from damage caused by abrasion or external forces that arise during processing, handling, and installation of the optical fiber. The primary coating is a softer material (lower Young's modulus) than the secondary coating and is designed to buffer or dissipates stresses that result from lateral forces applied to the outer surface of the secondary coating. The primary coating is especially important in dissipating stresses that arise due to the microbends that the optical fiber encounters when deployed in a cable.

The primary coating should maintain adequate adhesion to the glass fiber during thermal and hydrolytic aging, yet be strippable from the glass fiber for splicing purposes.

Primary and secondary coatings are typically formed by applying a curable coating composition to the glass fiber as a viscous liquid and curing. The optical fiber may also include a tertiary coating (not shown) that surrounds the secondary coating. The tertiary coating may include pigments, inks or other coloring agents to mark the optical fiber for identification purposes and typically has a Young's modulus similar to the Young's modulus of the secondary coating.

Primary Coating Compositions. The primary coating is a cured product of a curable primary coating composition. The curable primary coating compositions provide a primary coating for optical fibers that exhibits low Young's modulus, low pullout force, and strong cohesion. The curable primary coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces. Even for optical fibers with reduced primary coating thicknesses, the optical fibers are expected to have low loss and low microbend loss performance. The primary coatings exhibit these advantages even at reduced thickness.

The primary coating is a cured product of a radiation-curable primary coating composition that includes an oligomer, a monomer, a photoinitiator and, optionally, an additive. The following disclosure describes oligomers for the radiation-curable primary coating compositions, radiation-curable primary coating compositions containing at least one of the oligomers, cured products of the radiation-curable primary coating compositions that include at least one of the oligomers, glass fibers coated with a radiation-curable primary coating composition containing at least one of the oligomers, and glass fibers coated with the cured product of a radiation-curable primary coating composition containing at least one of the oligomers.

The oligomer preferably includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

A preferred diisocyanate compound is represented by formula (I):

$$O=C=N-R_1-N=C=O \quad (I)$$

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

The polyol is represented by molecular formula (II):

$$H-O-[R_2-O]_x-H \quad (II)$$

where $R_2$ includes an alkylene group, to $O-R_2-$ is a repeating alkoxylene group, and x is an integer. Preferably, x is greater than 20, or greater than 40, or greater than 50, or greater than 75, or greater than 100, or greater than 125, or greater than 150, or in the range from 20 to 500, or in the range from 20 to 300, or in the range from 30 to 250, or in the range from 40 to 200, or in the range from 60 to 180, or in the range from 70 to 160, or in the range from 80 to 140. $R_2$ is preferably a linear or branched alkylene group, such as methylene, ethylene, propylene (normal, iso or a combination thereof), or butylene (normal, iso, secondary, tertiary, or a combination thereof). The polyol may be a polyalkylene oxide, such as polyethylene oxide, or a polyalkylene glycol, such as polypropylene glycol. Polypropylene glycol is a preferred polyol. The molecular weight of the polyol is greater than 1000 g/mol, or greater than 2500 g/mol, or greater than 5000 g/mol, or greater than 7500 g/mol, or greater than 10000 g/mol, or in the range from 1000 g/mol to 20000 g/mol, or in the range from 2000 g/mol to 15000 g/mol, or in the range from 2500 g/mol to 12500 g/mol, or in the range from 2500 g/mol to 10000 g/mol, or in the range from 3000 g/mol to 7500 g/mol, or in the range from 3000 g/mol to 6000 g/mol, or in the range from 3500 g/mol to 5500 g/mol. In some embodiments, the polyol is polydisperse and includes molecules spanning a range of molecular weights such that the totality of molecules combines to provide the number average molecular weight specified hereinabove.

The unsaturation of the polyol is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or less than 0.01 meq/g, or less than 0.005 meq/g, or in the range from meq/g to 0.15 meq/g, or in the range from 0.005 meq/g to 0.10 meq/g, or in the range from meq/g to 0.10 meq/g, or in the range from 0.01 meq/g to 0.05 meq/g, or in the range from 0.02 meq/g to 0.10 meq/g, or in the range from 0.02 meq/g to 0.05 meq/g. As used herein, unsaturation refers to the value determined by the standard method reported in ASTM D4671-16. In the method, the polyol is reacted with mercuric acetate and methanol in a methanolic solution to produce acetoxymercuricmethoxy compounds and acetic acid. The reaction of the polyol with mercuric acetate is equimolar and the amount of acetic acid released is determined by titration with alcoholic potassium hydroxide to provide the measure of unsaturation used herein. To prevent interference of excess mercuric acetate on the titration of acetic acid, sodium bromide is added to convert mercuric acetate to the bromide.

The reaction to form the oligomer further includes addition of a hydroxy acrylate compound to react with terminal isocyanate groups present in unreacted starting materials (e.g. the diisocyanate compound) or products formed in the reaction of the diisocyanate compound with the polyol (e.g. urethane compounds with terminal isocyanate groups). The hydroxy acrylate compound reacts with terminal isocyanate groups to provide terminal acrylate groups for one or more constituents of the oligomer. In some embodiments, the hydroxy acrylate compound is present in excess of the amount needed to fully convert terminal isocyanate groups to terminal acrylate groups. The oligomer includes a single polyether urethane acrylate compound or a combination of two or more polyether urethane acrylate compounds.

The hydroxy acrylate compound is represented by molecular formula (III):

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. The discussion that follows describes hydroxy acrylate compounds. It should be understood, however, that the discussion applies to substituted hydroxy acrylate compounds and in particular to hydroxy methacrylate compounds.

In different embodiments, the hydroxy acrylate compound is a hydroxyalkyl acrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. In various embodiments, the water content of the hydroxy acrylate compound is at least 300 ppm, or at least 600 ppm, or at least 1000 ppm, or at least 1500 ppm, or at least 2000 ppm, or at least 2500 ppm.

In the foregoing exemplary molecular formulas (I), II), and (III), the groups $R_1$, $R_2$, and $R_3$ independently are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers.

(e.g. using FTIR spectroscopy to detect the presence of isocyanate groups). Additional aliquots of hydroxy acrylate compound may be added to the product composition to stoichiometrically react with unreacted isocyanate groups (using, for example, FTIR spectroscopy to monitor a decrease in a characteristic isocyanate frequency (e.g. at 2260 cm$^{-1}$ to 2270 cm$^{-1}$) as isocyanate groups are converted by the hydroxy acrylate compound). In alternate embodiments, aliquots of hydroxy acrylate compound in excess of the amount needed to stoichiometrically react with unreacted isocyanate groups are added. As described more fully below, for a given value of p, the ratio of the mole number m to the mole number n influences the relative proportions of polyether urethane diacrylate compound and di-adduct compound in the oligomer and differences in the relative proportions of polyether urethane diacrylate compound and di-adduct compound lead to differences in the tear strength and/or critical stress of coatings formed from the oligomer.

In one embodiment, the oligomer is formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol has a number average molecular weight in the range from 2500 g/mol to 6500 g/mol, or in the range from 3000 g/mol to 6000 g/mol, or in the range from 3500 g/mol to 5500 g/mol.

The oligomer preferably includes two components. The first component is a polyether urethane diacrylate compound having the molecular formula (IV):

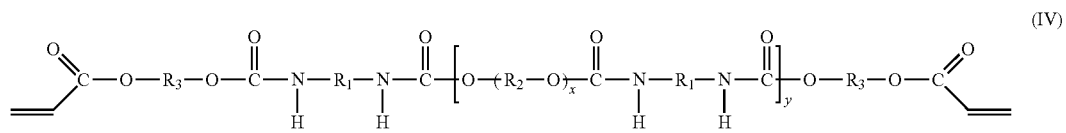

In embodiments, when p is 2.0, n is in the range from 3.0 to 5.0, or in the range from 3.2 to 4.8, or in the range from 3.4 to 4.6, or in the range from 3.5 to 4.4, or in the range from 3.6 to 4.2, or in the range from 3.7 to 4.0; and m is in the range from 1.5 to 4.0, or in the range from 1.6 to 3.6, or in the range from 1.7 to 3.2, or in the range from 1.8 to 2.8, or in the range from 1.9 to 2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

The mole number m may be selected to provide an amount of the hydroxy acrylate compound to stoichiometrically react with unreacted isocyanate groups present in the product composition formed from the reaction of diisocyanate compound and polyol used to form the oligomer. The isocyanate groups may be present in unreacted diisocyanate compound (unreacted starting material) or in isocyanate-terminated urethane compounds formed in reactions of the diisocyanate compound with the polyol. Alternatively, the mole number m may be selected to provide an amount of the hydroxy acrylate compound in excess of the amount needed to stoichiometrically react with any unreacted isocyanate groups present in the product composition formed from reaction of the diisocyanate compound and the polyol. The hydroxy acrylate compound is added as a single aliquot or multiple aliquots. In one embodiment, an initial aliquot of hydroxy acrylate is included in the reaction mixture used to form the oligomer and the product composition formed can be tested for the presence of unreacted isocyanate groups and the second component is a di-adduct compound having the molecular formula (V):

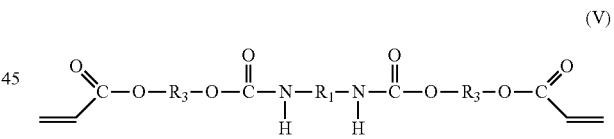

where the groups $R_1$, $R_2$, $R_3$, and the integer x are as described hereinabove, y is a positive integer, and it is understood that the group $R_1$ in molecular formulas (IV) and (V) is the same as group $R_1$ in molecular formula (I), the group $R_2$ in molecular formula (IV) is the same as group $R_2$ in molecular formula (II), and the group $R_3$ in molecular formulas (IV) and (V) is the same as group $R_3$ in molecular formula (III). The di-adduct compound corresponds to the compound formed by reaction of both terminal isocyanate groups of the diisocyanate compound of molecular formula (I) with the hydroxy acrylate compound of molecular formula (II) where the diisocyanate compound has undergone no reaction with the polyol of molecular formula (II).

The di-adduct compound is formed from a reaction of the diisocyanate compound with the hydroxy acrylate compound during the reaction used to form the oligomer. Alternatively, the di-adduct compound is formed independent of the reaction used to form the oligomer and is added to the product of the reaction used to form the polyether urethane diacrylate compound or to a purified form of the polyether urethane diacrylate compound. The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. The di-adduct compound is present in the oligomer in an amount of at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 2.5 wt % to 6.0 wt %, or in the range from 3.0 wt % to 8.0 wt %, or in the range from 3.0 wt % to 5.0 wt %, or in the range from 3.0 wt % to 5.5 wt %, or in the range from 3.5 wt % to 5.0 wt %, or in the range from 3.5 wt % to 7.0 wt %. It is noted that the concentration of di-adduct is expressed in terms of wt % of the oligomer and not in terms of wt % in the coating composition.

An illustrative reaction for synthesizing an oligomer in accordance with the present disclosure includes reaction of a diisocyanate compound (4,4'-methylene bis(cyclohexyl isocyanate, which is also referred to herein as H12MDI) and a polyol (polypropylene glycol with $M_n$~4000 g/mol, which is also referred to herein as PPG4000) to form a polyether urethane diisocyanate compound with formula (VI):

H12MDI~PPG4000~H12MDI~PPG4000~H12MDI    (VI)

where "~" denotes a urethane linkage formed by the reaction of a terminal isocyanate group of H12MDI with a terminal alcohol group of PPG4000; and ~H12MDI, ~H12MDI~, and ~PPG4000~ refer to residues of H12MDI and PPG4000 remaining after the reaction; and M n refers to number average molecular weight. The polyether urethane diisocyanate compound has a repeat unit of the type ~(H12MDI~PPG4000)~. The particular polyether urethane diisocyanate shown includes two PPG4000 units. The reaction may also provide products having one PPG4000 unit, or three or more PPG4000 units. The polyether urethane diisocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane diisocyanate compound forms the polyether urethane acrylate compound with formula (VII):

HEA~H12MDI~PPG4000~H12MDI~PPG4000~H12MDI    (VII)

and/or the polyether urethane diacrylate compound with formula (VIII):

HEA~H12MDI~PPG4000~H12MDI~PPG4000~
H12MDI~HEA    (VIII)

and reaction of HEA with unreacted H12MDI forms the di-adduct compound with formula (IX):

HEA~H12MDI~HEA    (IX)

where, as above, ~ designates a urethane linkage and ~HEA designates the residue of HEA remaining after reaction to form the urethane linkage (consistent with formulas (IV) and (V)). The combination of a polyether urethane diacrylate compound and a di-adduct compound in the product composition constitutes an oligomer in accordance with the present disclosure. As described more fully hereinbelow, when one or more oligomers are used in coating compositions, coatings having improved tear strength and critical stress characteristics result. In particular, it is demonstrated that oligomers having a high proportion of di-adduct compound provide coatings with high tear strengths and/or high critical stress values.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

The oligomer includes a compound that is a polyether urethane diacrylate compound with formula (X):

(hydroxy acrylate)~(diisocyanate~polyol)$_x$~diisocyanate~(hydroxy acrylate)    (X)

and a compound that is a di-adduct compound with formula (XI):

(hydroxy acrylate)~diisocyanate~(hydroxy acrylate)    (XI)

where the relative proportions of diisocyanate compound, hydroxy acrylate compound, and polyol used in the reaction to form the oligomer correspond to the mole numbers n, m, and p disclosed hereinabove.

Compounds represented by molecular formulas (I) and (II) above, for example, react to form a polyether urethane diisocyanate compound represented by molecular formula (XII):

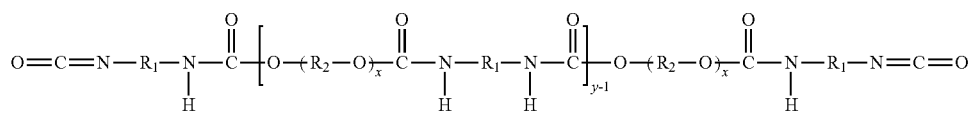
(XII)

where y is the same as y in formula (IV) and is 1, or 2, or 3 or 4 or higher; and x is determined by the number of repeat units of the polyol (as described hereinabove).

Further reaction of the polyether urethane isocyanate of molecular formula (VI) with the hydroxy acrylate of molecular formula (III) provides the polyether urethane diacrylate compound represented by molecular formula (IV) referred to hereinabove and repeated below:

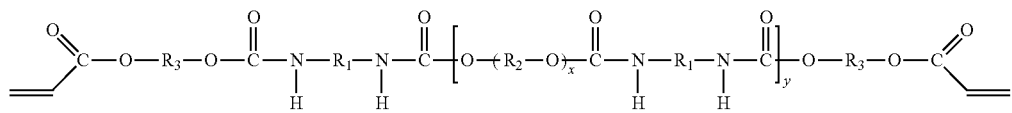

(IV)

where y is 1, or 2, or 3, or 4 or higher; and x is determined by the number of repeat units of the polyol (as described hereinabove).

In an embodiment, the reaction between the diisocyanate compound, hydroxy acrylate compound, and polyol yields a series of polyether urethane diacrylate compounds that differ in y such that the average value of y over the distribution of compounds present in the final reaction mixture is a non-integer. In an embodiment, the average value of y in the polyether urethane diisocyanates and polyether urethane diacrylates of molecular formulas (VI) and (IV) corresponds to p or p−1 (where p is as defined hereinabove). In an embodiment, the average number of occurrences of the group $R_1$ in the polyether urethane diisocyanates and polyether urethane diacrylates of the molecular formulas (XII) and (IV) correspond to n (where n is as defined hereinabove).

The relative proportions of the polyether urethane diacrylate and di-adduct compounds produced in the reaction are controlled by varying the molar ratio of the mole numbers n, m, and p. By way of illustration, the case where p=2.0 is considered. In the theoretical limit of complete reaction, two equivalents p of polyol would react with three equivalents n of a diisocyanate to form a compound having molecular formula (VI) in which y=2. The compound includes two terminal isocyanate groups, which can be quenched with subsequent addition of two equivalents m of a hydroxy acrylate compound in the theoretical limit to form the corresponding polyether urethane diacrylate compound (IV) with y=2. A theoretical molar ratio n:m:p=3.0:2.0:2.0 is defined for this situation.

In the foregoing exemplary theoretical limit, a reaction of diisocyanate, hydroxy acrylate, and polyol in the theoretical molar ratio n:m:p=3.0:2.0:2.0 provides a polyether urethane diacrylate compound having molecular formula (IV) in which y=2 without forming a di-adduct compound. Variations in the mole numbers n, m, and p provide control over the relative proportions of polyether urethane diacrylate and di-adduct formed in the reaction. Increasing the mole number n relative to the mole number m or the mole number p, for example, may increase the amount of di-adduct compound formed in the reaction. Reaction of the diisocyanate compound, the hydroxy acrylate compound, and polyol compound in molar ratios n:m:p, where n is in the range from 3.0 to 5.0, m is in the range within ±15% of 2n−4 or within ±10% of 2n−4 or within ±5% of 2n−4, and p is 2.0, for example, produce amounts of the di-adduct compound in the oligomer sufficient to achieve the preferred primary coating properties. By way of example, the embodiment in which n=4.0, m is within ±15% of 2n−4, and p=2.0 means that n=4.0, m is within ±15% of 4, and p=2.0, which means that that n=4.0, m is in the range from 3.4 to 4.6, and p=2.0.

Variations in the relative proportions of di-adduct and polyether urethane diacrylate are obtained through changes in the mole numbers n, m, and p and through such variations, it is possible to precisely control the Young's modulus, in situ modulus, tear strength, critical stress, tensile toughness, and other mechanical properties of coatings formed from coating compositions that include the oligomer. In one embodiment, control over properties is achievable by varying the number of units of polyol in the polyether urethane diacrylate compound (e.g. p=2.0 vs. p=3.0 vs. p=4.0). In another embodiment, control of tear strength, tensile toughness, and other mechanical properties is achieved by varying the proportions polyether urethane diacrylate compound and di-adduct compound. For a polyether urethane compound with a given number of polyol units, oligomers having variable proportions of di-adduct compound can be prepared. The variability in proportion of di-adduct compound can be finely controlled to provide oligomers based on a polyether urethane diacrylate compound with a fixed number of polyol units that provide coatings that offer precise or targeted values of tear strength, critical stress, tensile toughness, or other mechanical properties.

Improved fiber primary coatings result when utilizing a primary coating composition that incorporates an oligomer that includes a polyether urethane acrylate compound represented by molecular formula (IV) and a di-adduct compound represented by molecular formula (V), where concentration of the di-adduct compound in the oligomer is at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. It is noted that the concentration of di-adduct is expressed in terms of wt % of the oligomer and not in terms of wt % in the coating composition. The concentration of the di-adduct compound is increased in one embodiment by varying the molar ratio n:m:p of diisocyanate:hydroxy acrylate:polyol. In one aspect, molar ratios n:m:p that are rich in diisocyanate relative to polyol promote the formation of the di-adduct compound.

In the exemplary stoichiometric ratio n:m:p=3:2:2 described hereinabove, the reaction proceeds with p equivalents of polyol, n=p+1 equivalents of diisocyanate, and two equivalents of hydroxy acrylate. If the mole number n exceeds p+1, the diisocyanate compound is present in excess relative to the amount of polyol compound needed to form the polyether urethane acrylate of molecular formula (IV). The presence of excess diisocyanate shifts the distribution of reaction products toward enhanced formation of the di-adduct compound.

To promote formation of the di-adduct compound from excess diisocyanate compound, the amount of hydroxy acrylate can also be increased. For each equivalent of diisocyanate above the stoichiometric mole number n=p+1, two equivalents of hydroxy acrylate are needed to form the di-adduct compound. In the case of arbitrary mole number p (polyol), the stoichiometric mole numbers n (diisocyanate) and m (hydroxy acrylate) are p+1 and 2, respectively. As the mole number n is increased above the stoichiometric value, the equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane acrylate compound (compound having molecular formula (V)) and the term 2[n−(p+1)] represents the equivalents of hydroxy acrylate needed to convert the excess starting diisocyanate to the di-adduct compound. If the actual value of the mole number m is less than this number of equivalents, the available hydroxy acrylate reacts with isocyanate groups present on the oligomer or free diisocyanate molecules to form terminal acrylate groups. The relative kinetics of the two reaction pathways dictates the relative amounts of polyether urethane diacrylate and di-adduct compounds formed and the deficit in hydroxy acrylate relative to the amount required to quench all unreacted isocyanate groups may be controlled to further influence the relative proportions of polyether urethane diacrylate and di-adduct formed in the reaction.

In some embodiments, the reaction includes heating the reaction composition formed from the diisocyanate compound, hydroxy acrylate compound, and polyol. The heating facilitates conversion of terminal isocyanate groups to terminal acrylate groups through a reaction of the hydroxy acrylate compound with terminal isocyanate groups. In different embodiments, the hydroxy acrylate compound is present in excess in the initial reaction mixture and/or is otherwise available or added in unreacted form to effect conversion of terminal isocyanate groups to terminal acrylate groups. The heating occurs at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

In an embodiment, conversion of terminal isocyanate groups on the polyether urethane diacrylate compound or starting diisocyanate compound (unreacted initial amount or amount present in excess) to terminal acrylate groups is facilitated by the addition of a supplemental amount of hydroxy acrylate compound to the reaction mixture. As indicated hereinabove, the amount of hydroxy acrylate compound needed to quench (neutralize) terminal isocyanate groups may deviate from the theoretical number of equivalents due, for example, to incomplete reaction or a desire to control the relative proportions of polyether urethane diacrylate compound and di-adduct compound. As described hereinabove, once the reaction has proceeded to completion or other endpoint, it is preferable to quench (neutralize) residual isocyanate groups to provide a stabilized reaction product. In an embodiment, supplemental hydroxy acrylate is added to accomplish this objective.

In an embodiment, the amount of supplemental hydroxy acrylate compound is in addition to the amount included in the initial reaction process. The presence of terminal isocyanate groups at any stage of the reaction is monitored, for example, by FTIR spectroscopy (e.g. using a characteristic isocyanate stretching mode near 2265 cm$^{-1}$) and supplemental hydroxy acrylate compound is added as needed until the intensity of the characteristic stretching mode of isocyanate groups is negligible or below a pre-determined threshold. In an embodiment, supplemental hydroxy acrylate compound is added beyond the amount needed to fully convert terminal isocyanate groups to terminal acrylate groups. In different embodiments, supplemental hydroxy acrylate compound is included in the initial reaction mixture (as an amount above the theoretical amount expected from the molar amounts of diisocyanate and polyol), added as the reaction progresses, and/or added after reaction of the diisocyanate and polyol compounds has occurred to completion or pre-determined extent.

Amounts of hydroxy acrylate compound above the amount needed to fully convert isocyanate groups are referred to herein as excess amounts of hydroxy acrylate compound. When added, the excess amount of hydroxy acrylate compound is at least 20% of the amount of supplemental hydroxy acrylate compound needed to fully convert terminal isocyanate groups to terminal acrylate groups, or at least 40% of the amount of supplemental hydroxy acrylate compound needed to fully convert terminal isocyanate groups to terminal acrylate groups, or at least 60% of the amount of supplemental hydroxy acrylate compound needed to fully convert terminal isocyanate groups to terminal acrylate groups, or at least 90% of the amount of supplemental hydroxy acrylate compound needed to fully convert terminal isocyanate groups to terminal acrylate groups.

In an embodiment, the amount of supplemental hydroxy acrylate compound may be sufficient to completely or nearly completely quench residual isocyanate groups present in the oligomer formed in the reaction. Quenching of isocyanate groups is desirable because isocyanate groups are relatively unstable and often undergo reaction over time. Such reaction alters the characteristics of the reaction composition or oligomer and may lead to inconsistencies in coatings formed therefrom. Reaction compositions and products formed from the starting diisocyanate and polyol compounds that are free of residual isocyanate groups are expected to have greater stability and predictability of characteristics.

The oligomer of the primary coating composition includes a polyether urethane diacrylate compound and di-adduct compound as described hereinabove. In some embodiments, the oligomer includes two or more polyether urethane diacrylate compounds and/or two or more di-adduct compounds. The oligomer content of the primary coating composition includes the combined amounts of the one or more polyether urethane diacrylate compound(s) and one or more di-adduct compound(s) and is greater than 20 wt %, or greater than 30 wt %, or greater than 40 wt %, or in the range from 20 wt % to 80 wt %, or in the range from 30 wt % to 70 wt %, or in the range from 40 wt % to 60 wt %, where the concentration of di-adduct compound within the oligomer content is as described above.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—$CH_2$—$CH_2$—), n-propoxylene (—O—$CH_2$—$CH_2$—$CH_2$—), iso-propoxylene (—O—$CH_2$—CH($CH_3$)—, or —O—CH($CH_3$)—$CH_2$—), etc. As used herein, the degree of alkoxylation refers to the number of alkoxylene groups in the monomer. In one embodiment, the alkoxylene groups are bonded consecutively in the monomer.

In some embodiments, the primary coating composition includes an alkoxylated monomer of the form $R_4$-$R_5$—O—(CH($CH_3$)$CH_2$—O)$_q$—C(O)CH=$CH_2$, where $R_4$ and $R_5$ are aliphatic, aromatic, or a mixture of both, and q=1 to 10, or $R_4$—O— (CH($CH_3$)$CH_2$—O)$_q$—C(O)CH=$CH_2$, where C(O) is a carbonyl group, $R_1$ is aliphatic or aromatic, and q=1 to 10.

Representative examples of monomers include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol diacrylate, propoxylated hexanediol diacrylate, tetrapropyleneglycol diacrylate, pentapropyleneglycol diacrylate, methacrylate analogs of the foregoing, and combinations thereof.

In some embodiments, the primary coating composition includes an N-vinyl amide monomer such as an N-vinyl lactam, or N-vinyl pyrrolidinone, or N-vinyl caprolactam, where the N-vinyl amide monomer is present in the coating composition at a concentration greater than 1.0 wt %, or greater than 2.0 wt %, or greater than 3.0 wt %, or in the range from 1.0 wt % to 15.0 wt %, or in the range from 2.0 wt % to 10.0 wt %, or in the range from 3.0 wt % to 8.0 wt %.

In an embodiment, the primary coating composition includes one or more monofunctional acrylate or methacrylate monomers in an amount from 15 wt % to 90 wt %, or from 30 wt % to 75 wt %, or from 40 wt % to 65 wt %. In another embodiment, the primary coating composition may include one or more monofunctional aliphatic epoxy acrylate or methacrylate monomers in an amount from 5 wt % to 40 wt %, or from 10 wt % to 30 wt %.

In an embodiment, the monomer component of the primary coating composition includes a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono (meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth) acrylate, 3-hydroxypropyl (meth)acrylate, and 4-hydroxybutyl (meth)acrylate (each available from Aldrich).

In an embodiment, the hydroxyfunctional monomer is present in an amount sufficient to improve adhesion of the primary coating to the optical fiber. The hydroxyfunctional monomer is present in the coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the coating. Hydroxyfunctional monomers are described in more detail in U.S. Pat. No. 6,563,996, the disclosure of which is hereby incorporated by reference in its entirety.

In different embodiments, the total monomer content of the primary coating composition is between about 15 wt % and about 90 wt %, or between about 30 wt % and about 75 wt %, or between about 40 wt % and about 65 wt %.

In addition to a curable monomer and a curable oligomer, the curable primary coating composition also includes a polymerization initiator. The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiators and/or phosphine oxide photoinitiators. When used in the curing of the coating composition, the photoinitiator is present in an amount sufficient to enable rapid radiation curing.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The coating composition includes a single photoinitiator or a combination of two or more photoinitiators. The total photoinitiator content of the coating composition is up to about 10 wt %, or between about 0.5 wt % and about 6 wt %.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation).

An adhesion promoter is a compound that facilitates adhesion of the primary coating and/or primary composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter is present in the primary coating composition in an amount between 0.02 wt % and 10.0 wt %, or between 0.05 wt % and 4.0 wt %, or between 0.1 wt % and 4.0 wt %, or between 0.1 wt % and 3.0 wt %, or between 0.1 wt % and 2.0 wt %, or between 0.1 wt % and 1.0 wt %, or between 0.5 wt % and 4.0 wt %, or between 0.5 wt % and 3.0 wt %, or between 0.5 wt % and 2.0 wt %, or between 0.5 wt % and 1.0 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the coating composition in an amount greater than 0.25 wt %, or greater than 0.50 wt %, or greater than 0.75 wt %, or greater than 1.0 wt %, or an amount in the range from 0.25 wt % to 3.0 wt %, or an amount in the range from 0.50 wt % to 2.0 wt %, or an amount in the range from 0.75 wt % to 1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the coating composition at a concentration of 0.005 wt % to 0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt % to 0.5 wt %.

Primary Coating—Properties. Relevant properties of the primary coating include radius, thickness, Young's modulus, and in situ modulus.

The radius $r_5$ of the primary coating is less than or equal to 85.0 microns, or less than or equal to 80.0 microns, or less than or equal to 75.0 microns, or less than or equal to 70.0 microns.

To facilitate decreases in the diameter of the optical fiber, it is preferable to minimize the thickness $r_5$-$r_4$ of the primary coating. The thickness $r_5$-$r_4$ of the primary coating is less than or equal to 25.0 microns, or less than or equal to 20.0 microns, or less than or equal to 15.0 microns, or less than or equal to 10.0 microns, or in the range from 5.0 microns to 25.0 microns, or in the range from 8.0 microns to 20.0 microns, or in the range from 10.0 microns to 17.0 microns.

To facilitate effective buffering of stress and protection of the glass fiber, it is preferable for the primary coating to have a low Young's modulus and/or a low in situ modulus. The Young's modulus of the primary coating is less than or equal to 0.7 MPa, or less than or equal to 0.6 MPa, or less than or equal to 0.5 MPa, or less than or equal to 0.4 MPa, or in the range from 0.2 MPa to 0.7 MPa, or in the range from 0.3 MPa to 0.6 MPa. The in situ modulus of the primary coating is less than or equal to 0.25 MPa, or less than or equal to 0.20 MPa, or less than or equal to 0.15 MPa, or less than or equal to 0.10 MPa, or in the range from 0.05 MPa to 0.25 MPa, or in the range from 0.10 MPa to 0.20 MPa.

Secondary Coating—Compositions. The secondary coating is a cured product of a curable secondary coating composition that includes a monomer, a photoinitiator, an optional oligomer, and an optional additive. The present disclosure describes optional oligomers for the radiation-curable secondary coating compositions, radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. The one or more monomers may be present in an amount of 50 wt % or greater, or in an amount from about 60 wt % to about 99 wt %, or in an amount from about 75 wt % to about 99 wt %, or in an amount from about 80 wt % to about 99 wt % or in an amount from about 85 wt % to about 99 wt %. In one embodiment, the secondary coating is the radiation-cured product of a secondary coating composition that contains urethane acrylate monomers.

The monomers include functional groups that are polymerizable groups and/or groups that facilitate or enable cross-linking. The monomers are monofunctional monomers or multifunctional monomers. In combinations of two or more monomers, the constituent monomers are monofunctional monomers, multifunctional monomers, or a combination of monofunctional monomers and multifunctional monomers. In one embodiment, the monomer component of the curable secondary coating composition includes ethylenically unsaturated monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

In one embodiment, the monomer component of the curable secondary coating composition includes ethylenically unsaturated monomers. The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), iso-propoxylene (—O—CH$_2$—CH(CH$_3$)—), etc. As used herein, the degree of alkoxylation refers to the number of alkoxylene groups in the monomer. In one embodiment, the alkoxylene groups are bonded consecutively in the monomer.

As used herein, degree of alkoxylation refers to the number of alkoxylene groups divided by the number of acrylate and methacrylate groups in a molecule of the monomer. For monofunctional alkoxylated monomers, the degree of alkoxylation corresponds to the number of alkoxylene groups in a molecule of the monomer. In a preferred embodiment, the alkoxylene groups of a monofunctional alkoxylated monomer are bonded consecutively. For a difunctional alkoxylated monomer, the degree of alkoxylation corresponds to one half of the number of alkoxylene groups in a molecule of the monomer. In a preferred embodiment, the alkoxylene groups in a difunctional alkoxylated monomer are bonded consecutively in each of two groups where the two groups are separated by a chemical linkage and each group includes half or approximately half of the number of alkoxylene groups in the molecule. For a trifunctional alkoxylated monomer, the degree of alkoxylation corresponds to one third of the number of alkoxylene groups in a molecule of the monomer. In a preferred embodiment, the alkoxylene groups in a trifunctional alkoxylated monomer are bonded consecutively in three groups, where the three groups are separated by chemical linkages and each group includes a third or approximately a third of the number of alkoxylene groups in the molecule.

Representative multifunctional ethylenically unsaturated monomers for the curable secondary coating composition include, without limitation, alkoxylated bisphenol-A diacrylates, such as ethoxylated bisphenol-A diacrylate, and alkoxylated trimethylolpropane triacrylates, such as ethoxylated trimethylolpropane triacrylate, with the degree of alkoxylation being 2 or greater, or 4 or greater, or 6 or greater, or less than 16 or less than 12, or less than 8, or less than 5, or in the range from 2 to 16, or in the range from 2 to 12, or in the range from 2 to 8, or in the range from 2 to 4, or in the range from 3 to 12, or in the range from 3 to 8, or in the range from 3 to 5, or in the range from 4 to 12, or in the range from 4 to 10, or in the range from 4 to 8.

Multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30 (e.g. SR349, SR601, and SR602 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

Multifunctional ethylenically unsaturated monomers of the curable secondary coating composition include ethoxylated bisphenol-A diacrylate with a degree of ethoxylation ranging from 2 to 16 (e.g. SR349, SR601, and SR602 available from Sartomer Company, Inc. West Chester, Pa. and Photomer 4028, available from IGM Resins), or propoxylated bisphenol-A diacrylate with the degree of propoxylation being 2 or greater; for example, ranging from 2 to 16; methylolpropane polyacrylates with and without alkoxylation such as alkoxylated trimethylolpropane triacrylate or ethoxylated trimethylolpropane triacrylate with the degree of alkoxylation or ethoxylation being 2 or greater; for example, ranging from 2 to 16 or from 3 to 10 (e.g., Photomer 4149, IGM Resins, and SR499, Sartomer Company, Inc.); propoxylated-trimethylolpropane triacrylate with the degree of propoxylation being 2 or greater; for example, ranging from 2 to 16 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 2 or greater; for example, ranging from 2 to 16 (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from 2 to 16; epoxy acrylates formed by adding acrylate to bisphenol-A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In some embodiments, the curable secondary coating composition includes a multifunctional monomer with three or more curable functional groups in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, each of the three or more curable functional groups is an acrylate group.

In some embodiments, the curable secondary coating composition includes a trifunctional monomer in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, the trifunctional monomer is a triacrylate monomer.

In some embodiments, the curable secondary coating composition includes a difunctional monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes a difunctional monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes two or more trifunctional monomers in a combined amount in the range from 2.0 wt % to 25 wt %, or in the range from 5.0 wt % to 20 wt %, or in the range from 8.0 wt % to 15 wt %. In a preferred embodiment, each of the two or more difunctional monomers is a diacrylate monomer and each of the two or more trifunctional monomers is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In some embodiments, the curable secondary coating composition lacks a monofunctional monomer and includes two or more difunctional monomers in a combined amount greater than 70 wt %, or greater than 75 wt %, or greater than 80 wt %, or greater than 85 wt %, or in the range from 70 wt % to 95 wt %, or in the range from 75 wt % to 90 wt %, and further includes two or more trifunctional monomers in a combined amount in the range from 2.0 wt % to 25 wt %, or in the range from 5.0 wt % to 20 wt %, or in the range from 8.0 wt % to 15 wt %. In a preferred embodiment, the each of the difunctional monomers is a diacrylate monomer and each of the trifunctional monomers is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

A preferred difunctional monomer is an alkoxylated bisphenol-A diacrylate. Alkoxylated bisphenol-A diacrylate has the general formula (XIII):

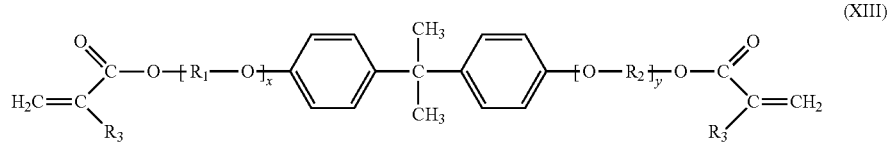

(XIII)

where $R_1$ and $R_2$ are alkylene groups, $R_1$-O and $R_2$—O are alkoxylene groups, and $R_3$ is H. Any two of the groups $R_1$, $R_2$, and $R_3$ are the same or different. In one embodiment, the groups $R_1$ and $R_2$ are the same. The number of carbons in each of the groups $R_1$ and $R_2$ is in the range from 1 to 8, or in the range from 2 to 6, or in the range from 2 to 4. The degree of alkoxylation is ½ (x+y). The values of x and y are the same or different. In one embodiment, x and y are the same.

A preferred trifunctional monomer is an alkoxylated trimethylolpropane triacrylate. Alkoxylated trimethylolpropane triacrylate has the general formula (XIV):

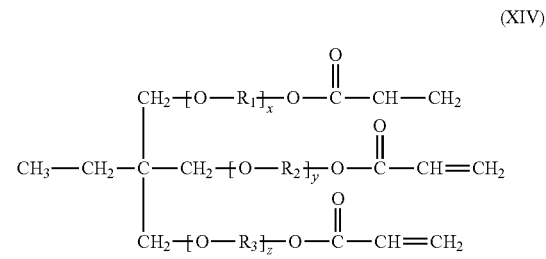

(XIV)

where $R_1$ and $R_2$ are alkylene groups, O—$R_1$, O—$R_2$, and O—$R_3$ are alkoxylene groups. Any two of the groups $R_1$, $R_2$, and $R_3$ are the same or different. In one embodiment, the groups $R_1$, $R_2$, and $R_3$ are the same. The number of carbons in the each of the groups $R_1$, $R_2$, and $R_3$ is in the range from 1 to 8, or in the range from 2 to 6, or in the range from 2 to 4. The degree of alkoxylation is ⅓(x+y+z). The values of any two of x, y and z are the same or different. In one embodiment, x, y, and z are the same.

Another preferred trifunctional monomer is a tris[(acryloyloxy)alkyl]isocyanurate. Tris[(acryloyloxy)alkyl]isocyanurates are also referred to as tris[n-hydroxyalkyl) isocyanurate triacrylates. A representative tris[(acryloyloxy)alkyl] isocyanurate is tris[2-hydroxyethyl) isocyanurate triacrylate, which has the general formula (XV):

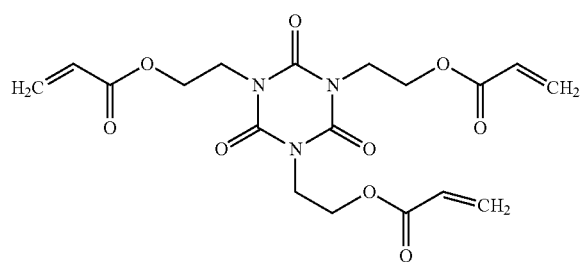

(XV)

In formula (III), an ethylene linkage (—CH$_2$—CH$_2$—) bonds each acryloyloxy group to a nitrogen of the isocyanurate ring. In other embodiments of tris[(acryloyloxy)alkyl]isocyanurates, alkylene linkages other than ethylene bond the acryloyloxy groups to nitrogen atoms of the isocyanurate ring. The alkylene linkages for any two of the three alkylene linkages are the same or different. In one embodiment, the three alkylene linkages are the same. The number of carbons in each of the alkylene linkages is in the range from 1 to 8, or in the range from 2 to 6, or in the range from 2 to 4.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from to 35.

In one embodiment, the curable secondary composition includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an ethoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl]isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl]isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an ethoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

The optional oligomer present in the radiation-curable secondary coating composition is preferably a compound with urethane linkages. In one aspect, the optional oligomer is a reaction product of a polyol compound, a diisocyanate compound, and a hydroxy-functional acrylate compound. Reaction of the polyol compound with the diisocyanate compound provides a urethane linkage and the hydroxy-functional acrylate compound reacts with isocyanate groups to provide terminal acrylate groups. If present, the total oligomer content in the radiation-curable secondary coating composition is less than 3.0 wt %, or less than 2.0 wt %, or less than 1.0 wt %, or in the range from 0 wt % to 3.0 wt %, or in the range from 0.1 wt % to 3.0 wt %, or in the range from 0.2 wt % to 2.0 wt %, or in the range from 0.3 wt % to 1.0 wt %. In one embodiment, the radiation-curable secondary coating composition is devoid of oligomers.

One class of optional oligomers is ethylenically unsaturated oligomers. When included, suitable oligomers may be monofunctional oligomers, multifunctional oligomers, or a combination of a monofunctional oligomer and a multifunctional oligomer. If present, the oligomer component may include aliphatic and aromatic urethane (meth)acrylate oligomers, urea (meth)acrylate oligomers, polyester and polyether (meth)acrylate oligomers, acrylated acrylic oligomers, polybutadiene(meth)acrylate oligomers, polycarbonate(meth)acrylate oligomers, and melamine(meth)acrylate oligomers or combinations thereof. The curable secondary coating composition may be free of urethane groups, urethane acrylate compounds, urethane oligomers, or urethane acrylate oligomers.

Urethane oligomers may be prepared by reacting an aliphatic or aromatic diisocyanate with a dihydric polyether or polyester, most typically a polyoxyalkylene glycol such as a polyethylene glycol. Moisture-resistant oligomers may be synthesized in an analogous manner, except that polar polyethers or polyester glycols are avoided in favor of predominantly saturated and predominantly nonpolar aliphatic diols. These diols may include alkane or alkylene diols of from about 2-250 carbon atoms that may be substantially free of ether or ester groups.

Polyurea elements may be incorporated in oligomers prepared by these methods, for example, by substituting diamines or polyamines for diols or polyols in the course of synthesis.

The curable secondary coating composition also includes a photoinitiator and optionally includes additives such as anti-oxidant(s), optical brightener(s), amine synergist(s), tackifier(s), catalyst(s), a carrier or surfactant, and a stabilizer as described above in connection with the curable primary coating composition.

The curable secondary coating composition includes a single photoinitiator or a combination of two or more photoinitiators. The total photoinitiator content of the curable secondary coating composition is up to about 10 wt %, or between about 0.5 wt % and about 6 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the curable secondary coating composition in an amount greater than wt %, or greater than 0.50 wt %, or greater than 0.75 wt %, or greater than 1.0 wt %, or an amount in the range from 0.25 wt % to 3.0 wt %, or an amount in the range from 0.50 wt % to 2.0 wt %, or an amount in the range from 0.75 wt % to 1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the curable secondary coating composition at a concentration of 0.005 wt % to 0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt % to 0.5 wt %.

Secondary Coating—Properties. Relevant properties of the secondary coating include radius, thickness, Young's modulus, tensile strength, yield strength, elongation at yield, glass transition temperature, and puncture resistance The radius $r_6$ of the secondary coating is less than or equal to 95.0 microns, or less than or equal to 90.0 microns, or less than or equal to 85.0 microns, or less than or equal to 80.0 microns.

To facilitate decreases in the diameter of the optical fiber, it is preferable to minimize the thickness $r_6$-$r_5$ of the secondary coating. The thickness $r_6$-$r_5$ of the secondary coating is less than or equal to 25.0 microns, or less than or equal to 20.0 microns, or less than or equal to 15.0 microns, or less than or equal to 10.0 microns, or in the range from 5.0 microns to microns, or in the range from 8.0 microns to 20.0 microns, or in the range from 10.0 microns to 18.0 microns, or in the range from 12.0 microns to 16.0 microns.

To facilitate puncture resistance and high protective function, it is preferable for the secondary coating to have a high Young's modulus. The Young's modulus of the secondary coating is greater than or equal to 1600 MPa, or greater than or equal to 1800 MPa, or greater than or equal to 2000 MPa, or greater than or equal to 2200 MPa, or in the range from 1600 MPa to 2800 MPa, or in the range from 1800 MPa to 2600 MPa.

Design Examples—Optical Fibers

Seven modeled design examples Ex. 1 through Ex. 7 of the optical fiber 100 with different core/cladding designs and optical attributes are set forth in Tables 1-2 below. Ex. 1 and Ex. 2 are step index fibers having a relative refractive index profile of the type shown in FIG. 6A. Ex. 1 and Ex. 2 comprise a Cl-doped silica core surrounded by a single cladding consisting of undoped silica. Ex. 3 is a step index fiber having a relative refractive index profile of the type shown in FIG. 6D. Ex. 3 comprises a Cl-doped silica core surrounded by a downdoped silica inner cladding (corresponding to a trench), which is surrounded by an undoped silica outer cladding. Ex. 4 is a step index fiber having a relative refractive index profile of the type shown in FIG. 6C. Ex. 4 comprises a Cl-doped silica core surrounded by an undoped silica inner cladding, which is surrounded by an updoped silica outer cladding. Ex. 5 is a fiber having a relative refractive index profile shown in FIG. 6C having a high alpha core, a depressed inner cladding and an outer cladding. Ex. 5 comprises a Cl-doped silica core surrounded by a downdoped inner cladding (corresponding to a trench), which is surrounded by an undoped silica outer cladding. Ex. 6 is a having a relative refractive index profile shown in FIG. 6C having a high alpha core, a depressed inner cladding and an outer cladding. Ex. 6 comprise a Cl-doped silica core surrounded by a downdoped inner cladding (corresponding to a trench), which is surrounded by an updoped silica outer cladding. Ex. 7 is a fiber having a relative refractive index profile shown in FIG. 6C having a high alpha core, a depressed inner cladding and an outer cladding. Ex. 7 comprises a Cl-doped silica core surrounded by an undoped inner cladding (corresponding to a trench), which is surrounded by an updoped silica outer cladding. The radius $r_4$ of the outer cladding of each of Ex. 1-Ex. 7 is 62.5 microns.

TABLE 1

| Parameter | Ex. 1 | Ex. 2 | Ex. 3 | Ex. 4 |
|---|---|---|---|---|
| $\Delta_1$ (%) | 0.34 | 0.34 | 0.34 | 0.347 |
| Core dopant | Cl | Cl | Cl | Cl |
| Core alpha | 100 | 100 | 100 | 100 |
| Cl in core (wt. %) | 5.40 | 5.40 | 5.40 | 5.51 |
| $r_1$ (microns) | 4.2 | 4.45 | 4.9 | 5.1 |
| $\Delta_2$ (%) | 0 | 0 | −0.07 | 0 |
| Inner cladding dopant | none | none | F | none |
| F in first clad (wt %) | 0 | 0 | 0.23 | 0 |
| F in first clad (mole %) | 0 | 0 | 0.7 | 0 |
| $r_2$ | | | 14.8 | 15.4 |
| $\Delta_4$ (%) | 0 | 0 | 0 | 0.07 |
| Outer Cladding Dopant | none | none | none | Cl |
| 22-meter cable cutoff $\lambda_{CC}$ (nm) | 1210 | 1250 | 1209 | 1209 |
| Zero-dispersion wavelength (nm) | 1306 | 1301 | 1289 | 1278 |
| Mode field diameter at 1310 nm (microns) | 9.1 | 9.2 | 9.1 | 9.3 |
| Effective area at 1310 nm (micron$^2$) | 66.2 | 68 | 68.6 | 72 |
| Dispersion at 1310 nm (ps/nm/km) | 0.35 | 0.75 | 2.55 | 2.87 |
| Dispersion Slope at 1310 nm (ps/nm$^2$/km) | 0.086 | 0.0866 | 0.0881 | 0.0888 |
| Mode field diameter at 1550 nm (microns) | 10.3 | 10.4 | 10 | 10.2 |
| Effective area at 1550 nm (micron$^2$) | 80.2 | 83.6 | 80.1 | 83.3 |
| Dispersion at 1550 nm (ps/nm/km) | 17 | 17.5 | 19.6 | 20.1 |
| Dispersion Slope at 1550 nm (ps/nm$^2$/km) | 0.0576 | 0.0579 | 0.0587 | 0.0593 |
| Attenuation at 1550 nm (dB/km) | <0.170 | <0.170 | <0.170 | <0.170 |

All the exemplary optical fibers in Ex. 1-Ex. 4 set forth in Table 1 have a Cl-doped core design with a chlorine concentration greater than 3 wt % and an attenuation of less than 0.170 dB/km at 1550 nm.

TABLE 2

| Parameter | Ex. 5 | Ex. 6 | Ex. 7 |
|---|---|---|---|
| $\Delta_1$ (%) | 0.2 | 0.2 | 0.25 |
| Core alpha | 20 | 20 | 20 |
| Cl conc in core (wt %) | 3.17 | 3.17 | 3.17 |
| $r_1$ (microns) | 6.2 | 7.3 | 7.4 |
| $\Delta_2$ (%) | −0.12 | −0.05 | 0 |
| $r_2$ (microns) | 22 | 25 | 25 |
| $V_2$ (% $\Delta$micron$^2$) | 107 | 57 | 62 |
| $\Delta_4$ (%) | 0 | 0.02 | 0.055 |
| $r_4$ (microns) | 62.5 | 62.5 | 62.5 |
| Mode field diameter at 1550 nm (microns) | 11.79 | 13.571 | 13.65 |
| Effective area at 1550 nm (micron$^2$) | 112.3 | 150.1 | 152.3 |
| Dispersion at 1550 nm (ps/nm/km) | 20.947 | 21.3 | 21.27 |
| Dispersion Slope at 1550 nm (ps/nm$^2$/km) | 0.0609 | 0.061 | 0.061 |
| 22-meter cable cutoff $\lambda_{CC}$ (nm) | <1400 | <1430 | <1450 |
| 20 mm bend loss at 1550 nm (dB/turn) | 0.9332 | 2.0855 | 2.0497 |
| 30 mm bend loss at 1550 nm (dB/turn) | 0.2382 | 0.5117 | 0.3109 |
| 40 mm bend loss at 1550 nm (dB/turn) | 0.0968 | 0.1287 | 0.0603 |
| 50 mm bend loss at 1550 nm (dB/turn) | 0.0394 | 0.0324 | 0.0117 |
| 60 mm bend loss at 1550 nm (dB/turn) | 0.0160 | 0.0081 | 0.0023 |
| Attenuation at 1550 nm (dB/km) | <0.170 | <0.170 | <0.170 |

All the exemplary optical fibers in Ex. 5-Ex. 7 set forth in Table 2 have a Cl-doped core design with a chlorine concentration greater than 3 wt % and an attenuation of less than 0.170 dB/km at 1550 nm.

The following examples illustrate preparation of a representative primary and secondary coatings. Measurements of selected properties of the representative primary and secondary coatings are also described. In addition, modeled properties of glass fibers coated with primary and secondary coatings at different coating thickness and modulus are presented.

Design Examples—Primary Coating

Primary Coating—Oligomer. The primary coating composition included an oligomer. For purposes of illustration, preparation of exemplary oligomers from H12MDI (4,4'-methylene bis(cyclohexyl isocyanate), PPG4000 (polypropylene glycol with $M_n$~4000 g/mol) and HEA (2-hydroxyethyl acrylate) in accordance with the reaction scheme hereinabove is described. All reagents were used as supplied by the manufacturer and were not subjected to further purification. H12MDI was obtained from ALDRICH. PPG4000 was obtained from COVESTRO and was certified to have an unsaturation of 0.004 meq/g as determined by the method described in the standard ASTM D4671-16. HEA was obtained from KOWA.

The relative amounts of the reactants and reaction conditions were varied to obtain a series of six oligomers. Oligomers with different initial molar ratios of the constituents were prepared with molar ratios of the reactants satisfying H12MDI:HEA:PPG4000=n:m:p, where n was in the range from 3.0 to 4.0, m was in the range from 1.5n to 3 to 2.5n to 5, and p=2. In the reactions used to form the oligomers materials, dibutyltin dilaurate was used as a catalyst (at a level of 160 ppm based on the mass of the initial reaction mixture) and 2,6-di-tert-butyl-4-methylphenol (BHT) was used as an inhibitor (at a level of 400 ppm based on the mass of the initial reaction mixture).

The amounts of the reactants used to prepare each of the six oligomers are summarized in Table 3 below. The six oligomers are identified by separate Sample numbers 1-6. Corresponding sample numbers will be used herein to refer to coating compositions and cured films formed from coating compositions that individually contain each of the six oligomers. The corresponding mole numbers used in the preparation of each of the six samples are listed in Table 4 below. The mole numbers are normalized to set the mole number p of PPG4000 to 2.0.

TABLE 3

Reactants and Amounts for Exemplary Oligomer Samples 1-6

| Sample | H12MDI (g) | HEA (g) | PPG4000 (g) |
|---|---|---|---|
| 1 | 22 | 6.5 | 221.5 |
| 2 | 26.1 | 10.6 | 213.3 |
| 3 | 26.1 | 10.6 | 213.3 |

TABLE 3-continued

Reactants and Amounts for Exemplary Oligomer Samples 1-6

| Sample | H12MDI (g) | HEA (g) | PPG4000 (g) |
|---|---|---|---|
| 4 | 27.8 | 12.3 | 209.9 |
| 5 | 27.8 | 12.3 | 209.9 |
| 6 | 22 | 6.5 | 221.5 |

TABLE 4

Mole Numbers for Oligomer Samples 1-6

| Sample | H12MDI Mole Number (n) | HEA Mole Number (m) | PPG4000 Mole Number (p) | Di-adduct (wt %) |
|---|---|---|---|---|
| 1 | 3.0 | 2.0 | 2.0 | 1.3 |
| 2 | 3.7 | 3.4 | 2.0 | 3.7 |
| 3 | 3.7 | 3.4 | 2.0 | 3.7 |
| 4 | 4.0 | 4.0 | 2.0 | 5.0 |
| 5 | 4.0 | 4.0 | 2.0 | 5.0 |
| 6 | 3.0 | 2.0 | 2.0 | 1.3 |

The oligomers were prepared by mixing 4,4'-methylene bis(cyclohexyl isocyanate), dibutyltin dilaurate and 2,6-di-tert-butyl-4 methylphenol at room temperature in a 500 mL flask. The 500 mL flask was equipped with a thermometer, a $CaCl_2$ drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C. to 75° C. for about 1 to 1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 $cm^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C. to 75° C. for about 1 to 1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement. The HEA amounts listed in Table 1 include the initial amount of HEA in the composition and any amount of supplemental HEA needed to quench unreacted isocyanate groups.

The concentration (wt %) of di-adduct compound in each oligomer was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 microns, specified molecular weight range=200 g/mol to 400,000 g/mol). The third column (column 3) was sold under Part No. PL1110-6520 by Agilent Technologies and was packed with PLgel 100A stationary phase (polystyrene divinyl benzene copolymer, average particle size=5 microns, specified molecular weight range=up to 4,000 g/mol). The columns were calibrated with polystyrene standards ranging from 162 g/mol to 6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 µL, and run time=35 min (isocratic conditions). The detector was a Waters Alliance 2410 differential refractometer operated at 40° C. and sensitivity level 4. The samples were injected twice along with a THF+0.05% toluene blank.

The amount (wt %) of di-adduct in the oligomers was quantified using the preceding GPC system and technique. A calibration curve was obtained using standard solutions containing known amounts of the di-adduct compound (HEA~H12MDI~HEA) in THF. Standard solutions with di-adduct concentrations of 115.2 µg/g, 462.6 µg/g, 825.1 µg/g, and 4180 µg/g were prepared. (As used herein, the dimension "µg/g" refers to µg of di-adduct per gram of total solution (di-adduct+THF)). Two 100µl aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)=0.999564).

The di-adduct concentration in the oligomers was determined using the calibration. Samples were prepared by diluting ~0.10 g of oligomeric material in THF to obtain a ~1.5 g test solution. The test solution was run through the GPC instrument and the area of the peak associated with the di-adduct compound was determined. The di-adduct concentration in units of µg/g was obtained from the peak area and the calibration curve, and was converted to wt % by multiplying by the weight (g) of the test solution and dividing by the weight of the sample of oligomeric material before dilution with THF. The wt % of di-adduct compound present in each of the six oligomers prepared in this example are reported in Table 4.

Through variation in the relative mole ratios of H12MDI, HEA, and PPG4000, the illustrative oligomers include a polyether urethane compound of the type shown in molecular formula (IV) hereinabove and an enhanced concentration of di-adduct compound of the type shown in molecular formula (V) hereinabove.

Primary Coating—Compositions. Oligomers corresponding to Samples 1-6 were separately combined with other components to form a series of six coating compositions. The amount of each component in the coating composition is listed in Table 5 below. The entry in Table 5 for the oligomer includes the combined amount of polyether urethane acrylate compound and di-adduct compound present in the oligomer. A separate coating composition was made for each of the six exemplary oligomers corresponding to Samples 1-6, where the amount of di-adduct compound in the oligomeric material corresponded to the amount listed in Table 4.

TABLE 5

Coating Composition

| Component | Amount |
| --- | --- |
| Oligomeric Material | 49.10 wt % |
| Sartomer SR504 | 45.66 wt % |
| V-CAP/RC | 1.96 wt % |
| TPO | 1.47 wt % |
| Irganox 1035 | 0.98 wt % |
| adhesion promoter | 0.79 wt % |
| Tetrathiol | 0.03 wt % |

Sartomer SR504 is ethoxylated(4)nonylphenol acrylate (available from Sartomer). V-CAP/RC is N-vinylcaprolactam (available from ISP Technologies). TPO is 2,4,6-trimethylbenzoyl)diphenyl phosphine oxide (available from BASF under the trade name Lucirin and functions as a photoinitiator). Irganox 1035 is thiodiethylene bis[3-(3,5-di-tert-butyl)-4-hydroxy-phenyl) propionate] (available from BASF) and functions as an antioxidant. The adhesion promoters were 3-acryloxypropyl trimethoxysilane (available from Gelest) and 3-mercaptopropyl trimethoxysilane (available from Aldrich). 3-acryloxypropyl trimethoxysilane was used for Samples 1, 3, and 5. 3-mercaptopropyl trimethoxysilane was used for Samples 2, 4, and 6. Tetrathiol is a catalyst quencher.

The coating compositions of Table 5 were each formulated using a high-speed mixer in an appropriate container heated to 60° C., with a heating band or heating mantle. In each case, the components were weighed into the container using a balance and allowed to mix until the solid components were thoroughly dissolved and the mixture appeared homogeneous. The oligomer and monomers (SR504, NVC) of each composition were blended together for at least 10 minutes at 55° C. to 60° C. The photoinitiator, antioxidant, and catalyst quencher were then added, and blending was continued for one hour while maintaining a temperature of 55° C. to 60° C. Finally, the adhesion promoter was added, and blending was continued for 30 minutes at 55° C. to 60° C. to form the coating compositions.

Primary Coating—Properties—Tensile Properties. Tensile properties (Young's modulus, tensile strength at yield, and elongation at yield) were measured on films formed by curing the six coating compositions. Separate films were formed from each coating composition. Wet films of the coating composition were cast on silicone release paper with the aid of a draw-down box having a gap thickness of about 0.005". The wet films were cured with a UV dose of 1.2 J/cm 2 (measured over a wavelength range of 225 to 424 nm by a Light Bug model IL490 from International Light) by a Fusion Systems UV curing apparatus with a 600 W/in D-bulb (50% Power and approximately 12 ft/min belt speed) to yield cured coatings in film form. Cured film thickness was between about 0.0030" and 0.0035".

The films were aged (23° C., 50% relative humidity) for at least 16 hours prior to testing. Film samples were cut to dimensions of 12.5 cm×13 mm using a cutting template and a scalpel. Young's modulus, tensile strength at yield, and elongation at yield were measured at room temperature (approximately 20° C.) on the film samples using a MTS Sintech tensile test instrument following procedures set forth in ASTM Standard D882-97. Young's modulus is defined as the steepest slope of the beginning of the stress-strain curve. Films were tested at an elongation rate of 2.5 cm/min with the initial gauge length of 5.1 cm. The results are shown in Table 6.

TABLE 6

Young's Modulus, Tensile Strength, and Elongation of Film Samples

| Sample | Young's Modulus (MPa) | Tensile Strength (MPa) | Elongation (%) |
| --- | --- | --- | --- |
| 1 | 0.72 | 0.51 | 137.9 |
| 2 | 0.57 | 0.44 | 173 |
| 3 | 1.0 | 0.86 | 132.8 |
| 4 | 0.71 | 0.45 | 122.3 |
| 5 | 0.72 | 0.56 | 157.4 |
| 6 | 0.33 | 0.33 | 311.9 |

Primary Coating—Properties—In Situ Modulus. In situ modulus measurements of primary coating composition Samples 2, 3, and 5 were completed. In situ modulus measurements require forming the primary coatings on a glass fiber having a diameter of 125 microns. Each of Samples 2, 3, and 5 was separately applied as a primary coating composition to a glass fiber as the glass fiber was being drawn. The fiber draw speed was 50 m/s. The primary coating compositions were cured using a stack of five LED sources. Each LED source was operated at 395 nm and had an intensity of 12 W/cm 2. Subsequent to application and curing of the primary coating compositions, a secondary coating composition was applied to each of the cured primary coatings and cured using UV sources to form a secondary coating layer. The thickness of the primary coating was 32.5 microns and the thickness of the secondary coating was 26.0 microns.

The in situ modulus was measured using the following procedure. A six-inch sample of fiber was obtained and a one-inch section from the center of the fiber was window stripped and wiped with isopropyl alcohol. The window-stripped fiber was mounted on a sample holder/alignment stage equipped with 10 mm×5 mm rectangular aluminum tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was moved and a small dot of glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the in situ modulus measurement. The glue was allowed to dry with the fiber sample in this configuration to affix the fiber to the tabs. After drying, the length of fiber fixed to each of the tabs was trimmed to 5 mm. The coated length embedded in glue, the non-embedded coated length (the portion extending into the gap between the tabs), and the primary diameter were measured.

The in situ modulus measurements were performed on a Rheometrics DMTA IV dynamic mechanical testing apparatus at a constant strain of 9 e-6 1/s for a time of forty-five minutes at room temperature (21° C.). The gauge length was 15 mm. Force and the change in length were recorded and used to calculate the in situ modulus of the primary coating. The tab-mounted fiber samples were prepared by removing any epoxy from the tabs that would interfere with the 15 mm clamping length of the testing apparatus to ensure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed and the sample was removed once the analysis was completed.

The in situ modulus of primary coating Samples 2, 3, and 5 are listed in Table 7.

TABLE 7

In Situ Modulus of Selected Primary Coatings

| Sample | In-Situ Modulus (MPa) |
|---|---|
| 2 | 0.27 |
| 3 | 0.33 |
| 5 | 0.3 |

Design Examples—Secondary Coating

Secondary Coating Compositions. Representative curable secondary coating compositions are listed in Table 8.

TABLE 8

Secondary Coating Compositions

| | Composition | | | |
|---|---|---|---|---|
| Component | KA | KB | KC | KD |
| SR601 (wt %) | 72.0 | 30.0 | 30.0 | 30.0 |
| SR602 (wt %) | | 37.0 | 37.0 | 37.0 |
| SR349 (wt %) | | 30.0 | 15.0 | |
| SR399 (wt %) | | | 15.0 | |
| SR499 (wt %) | | | | 30.0 |
| CD9038 (wt %) | 10.0 | | | |
| Photomer 3016 (wt %) | 15.0 | | | |
| TPO (wt %) | 1.5 | | | |
| Irgacure 184 (wt %) | 1.5 | | | |
| Irgacure 1850 (wt %) | | 3.0 | 3.0 | 3.0 |
| Irganox 1035 (pph) | 0.5 | | | |
| DC-190 (pph) | 1.0 | | | |

SR601 is ethoxylated (4) bisphenol A diacrylate (a monomer). SR602 is ethoxylated (10) bisphenol A diacrylate (a monomer). SR349 is ethoxylated (2) bisphenol A diacrylate (a monomer). SR399 is dipentaerythritol pentaacrylate. SR499 is ethoxylated (6) trimethylolpropane triacrylate. CD9038 is ethoxylated (30) bisphenol A diacrylate (a monomer). Photomer 3016 is bisphenol A epoxy diacrylate (a monomer). TPO is a photoinitiator. Irgacure 184 is 1-hydroxycyclohexylphenyl ketone (a photoinitiator). Irgacure 1850 is bis(2,6-dimethoxybenzoyl)-2,4,4-trimethylpentylphosphine oxide (a photoinitiator). Irganox 1035 is thiodiethylene bis(3,5-di-tert-butyl)-4-hydroxyhydrocinnamate (an antioxidant). DC190 is silicone-ethylene oxide/propylene oxide copolymer (a slip agent). The concentration unit "pph" refers to an amount relative to a base composition that includes all monomers, oligomers, and photoinitiators. For example, for secondary coating composition KA, a concentration of 1.0 pph for DC-190 corresponds to 1 g DC-190 per 100 g combined of SR601, CD9038, Photomer 3016, TPO, and Irgacure 184.

A comparative curable secondary coating composition (A) and three representative curable secondary coating compositions (SB, SC, and SD) within the scope of the disclosure are listed in Table 9.

TABLE 9

Secondary Coating Compositions

| | Composition | | | |
|---|---|---|---|---|
| Component | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 10.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexylphenyl ketone (available from BASF), Irganox 1035 (an antioxidant) is benzenepropanoic acid, 3,5-bis(1,1-dimethylethyl)-4-hydroxy-thiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators. For example, for secondary coating composition A, a concentration of 1.0 pph for DC-190 corresponds to 1 g DC-190 per 100 g combined of PE210, M240, M2300, TPO, and Irgacure 184.

Secondary Coating—Properties. The Young's modulus, tensile strength at break, and elongation at break of secondary coatings made from secondary compositions A, KA, KB, KC, KD, SB, SC and SD were measured.

Secondary Coating—Properties—Measurement Techniques. Properties of secondary coatings were determined using the measurement techniques described below:

Tensile Properties. The curable secondary coating compositions were cured and configured in the form of cured rod samples for measurement of Young's modulus, tensile strength at yield, yield strength, and elongation at yield. The cured rods were prepared by injecting the curable secondary composition into Teflon® tubing having an inner diameter of about 0.025″. The rod samples were cured using a Fusion D bulb at a dose of about 2.4 J/cm 2 (measured over a wavelength range of 225-424 nm by a Light Bug model IL390 from International Light). After curing, the Teflon® tubing was stripped away to provide a cured rod sample of the secondary coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

Glass Transition Temperature. In situ Tg measurements of primary and secondary coatings were performed on fiber tube-off samples obtained from coated fibers. The coated fibers included a glass fiber having a diameter of 125 microns, a primary coating with thickness 32.5 microns surrounding and in direct contact with the glass fiber, and a secondary coating with thickness 26.0 microns surrounding and in direct contact with the glass fiber. The glass fiber and primary coating were the same for all samples measured. The primary coating was formed from the reference primary coating composition described below. Samples with a comparative secondary coating and a secondary coating in accordance with the present disclosure were measured.

The fiber tube-off samples were obtained using the following procedure: a 0.0055" Miller stripper was clamped down approximately 1 inch from the end of the coated fiber. The one-inch region of fiber was plunged into a stream of liquid nitrogen and held in the liquid nitrogen for 3 seconds. The coated fiber was then removed from the stream of liquid nitrogen and quickly stripped to remove the coating. The stripped end of the fiber was inspected for residual coating. If residual coating remained on the glass fiber, the sample was discarded and a new sample was prepared. The result of the stripping process was a clean glass fiber and a hollow tube of stripped coating that included intact primary and secondary coatings. The hollow tube is referred to as a "tube-off sample". The glass, primary and secondary coating diameter were measured from the end-face of the unstripped fiber.

In-situ Tg of the tube-off samples was run using a Rheometrics DMTA IV test instrument at a sample gauge length of 9 to 10 mm. The width, thickness, and length of the tube-off sample were input to the operating program of the test instrument. The tube-off sample was mounted and then cooled to approximately to 85° C. Once stable, the temperature ramp was run using the following parameters:
Frequency: 1 Hz
Strain: 0.3%
Heating Rate: 2° C./min.
Final Temperature: 150° C.
Initial Static Force=20.0 g
Static>Dynamic Force by=10.0%

The in-situ Tg of a coating is defined as the maximum value of tan δ in a plot of tan δ as a function of temperature, where tan δ is defined as:

$$\tan \delta = E''/E'$$

and E" is the loss modulus, which is proportional to the loss of energy as heat in a cycle of deformation and E' is the storage or elastic modulus, which is proportional to the energy stored in a cycle of deformation.

The tube-off samples exhibited distinct maxima in the tan δ plot for the primary and secondary coatings. The maximum at lower temperature (about −50° C.) corresponded to the in-situ Tg for the primary coating and the maximum at higher temperature (above 50° C.) corresponded to the in-situ Tg for the secondary coating.

In Situ Modulus of Secondary Coating. For secondary coatings, the in situ modulus was measured using fiber tube-off samples prepared from the fiber samples. A 0.0055 inch Miller stripper was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. If coating remained on the glass portion of the fiber sample, the tube-off sample was deemed defective and a new tube-off sample was prepared. A proper tube-off sample is one that stripped clean from the glass and consisted of a hollow tube with primary and secondary coating. The glass, primary and secondary coating diameter were measured from the end-face of the un-stripped fiber sample.

The fiber tube-off samples were run using a Rheometrics DMTA IV instrument at a sample gauge length 11 mm to obtain the in situ modulus of the secondary coating. The width, thickness, and length were determined and provided as input to the operating software of the instrument. The sample was mounted and run using a time sweep program at ambient temperature (21° C.) using the following parameters:
Frequency: 1 Rad/sec
Strain: 0.3%
Total Time=120 sec.
Time Per Measurement=1 sec
Initial Static Force=15.0 g
Static>Dynamic Force by=10.0%

Once completed, the last five E' (storage modulus) data points were averaged. Each sample was run three times (fresh sample for each run) for a total of fifteen data points. The averaged value of the three runs was reported.

Puncture Resistance of Secondary Coating. Puncture resistance measurements were made on samples that included a glass fiber, a primary coating, and a secondary coating. The glass fiber had a diameter of 125 microns. The primary coating was formed from the reference primary coating composition listed in Table 10 below. Samples with various secondary coatings were prepared as described below. The thicknesses of the primary coating and secondary coating were adjusted to vary the cross-sectional area of the secondary coating as described below. The ratio of the thickness of the secondary coating to the thickness of the primary coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the 52$^{nd}$ International Wire & Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the secondary coating thickness was equivalent on both sides of the glass fiber in a direction parallel to the glass slide. In this position, the thickness of the secondary coating was equal on both sides of the optical fiber in a direction parallel to the glass slide. The thickness of the secondary coating in the directions normal to the glass slide and above or below the glass fiber differed from the thickness of the secondary coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 75° diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the secondary coating. The diamond wedge was then driven into the secondary coating at a rate of 0.1 mm/min and the load on the secondary coating was measured. The load on the secondary coating increased as the diamond wedge was driven deeper into the secondary coating until puncture occurred, at which point a precipitous decrease in load was observed. The indentation load at which puncture was observed was recorded and is reported herein as grams of force. The experiment was repeated with the optical fiber in the same orientation to obtain ten measurement points, which were averaged to determine a puncture resistance for the orientation. A second set of ten measurement points was taken by rotating the orientation of the optical fiber by 180°.

Microbending. In the wire mesh covered drum test, the attenuation of light at wavelength of 1550 nm through a coated fiber having a length of 750 m was determined at room temperature. The microbend induced attenuation was determined by the difference between a zero-tension deployment and a high-tension deployment on the wire mesh drum. Separate measurements were made for two winding configurations. In the first configuration, the fiber was wound in a zero-tension configuration on an aluminum drum having a smooth surface and a diameter of approximately 400 mm. The zero-tension winding configuration provided a stress-free reference attenuation for light passing through the fiber. After sufficient dwell time, an initial attenuation measurement was performed. In the second winding configuration, the fiber sample was wound to an aluminum drum that was wrapped with fine wire mesh. For this deployment, the barrel surface of the aluminum drum was covered with wire mesh and the fiber was wrapped around the wire mesh. The mesh was wrapped tightly around the barrel without stretching and was kept intact without holes, dips, tearing, or damage. The wire mesh material used in the measurements was made from corrosion-resistant type 304 stainless steel woven wire cloth and had the following characteristics: mesh per linear inch: 165×165, wire diameter: 0.0019", width opening: 0.0041", and open area %: 44.0. A 750 m length of coated fiber was wound at 1 m/s on the wire mesh covered drum at 0.050 cm take-up pitch while applying 80 (+/−1) grams of tension. The ends of the fiber were taped to maintain tension and there were no fiber crossovers. The points of contact of the wound fiber with the mesh impart stress to the fiber and the attenuation of light through the wound fiber is a measure of stress-induced (microbending) losses of the fiber. The wire drum measurement was performed after a dwell time of 1-hour. The increase in fiber attenuation (in dB/km) in the measurement performed in the second configuration (wire mesh covered drum) relative to the first configuration (smooth drum) was determined for each wavelength. The average of three trials was determined at each wavelength and is reported as the wire mesh microbend loss.

Reference Primary Coating. In measurements of in situ glass transition temperature ($T_g$), puncture resistance, and wire mesh covered drum microbending attenuation, the measurement samples included a primary coating between the glass fiber and a secondary coating. The primary coating composition had the formulation given in Table 10 and is typical of commercially available primary coating compositions.

TABLE 10

| Reference Primary Coating Composition | |
|---|---|
| Component | Amount |
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis(3-mercapto propionate) | 0.032 pph | where the oligomeric material was prepared as described above from H12MDI, HEA, and PPG4000 using a molar ratio n:m:p=3.5:3.0:2.0, SR504 is ethoxylated(4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

Secondary Coatings—Properties—Tensile Properties. The results of tensile property measurements prepared from the curable secondary compositions are shown in Table 11.

TABLE 11

| | Tensile Properties of Secondary Coatings | | | |
|---|---|---|---|---|
| Composition | Tensile Strength (MPa) | Elongation at yield (%) | Yield Strength (MPa) | Young's Modulus (MPa) |
| KA | 54.3 | 39.0 | | 1528 |
| KB | 63.1 | 24.1 | | 1703 |
| KC | 45.7 | 28.4 | | 1242 |
| KD | 61.8 | 32.5 | | 1837 |
| A | 86.09 | 4.60 | 48.21 | 2049 |
| SB | 75.56 | 4.53 | 61.23 | 2532 |
| SC | 82.02 | 4.76 | 66.37 | 2653 |
| SD | 86.08 | 4.87 | 70.05 | 2776 |

The results show that secondary coatings prepared from compositions SB, SC, and SD exhibited higher Young's modulus, and higher yield strength than the secondary coating prepared from comparative composition A. The higher values represent improvements that make secondary coatings prepared for the curable coating compositions disclosed herein better suited for small diameter optical fibers. More specifically, the higher values enable use of thinner secondary coatings on optical fibers without sacrificing performance. Thinner secondary coatings reduce the overall diameter of the optical fiber and provide higher fiber counts in cables of a given cross-sectional area.

The Young's modulus of secondary coatings prepared as cured products from the curable secondary coating compositions disclosed herein is greater than 2400 MPa, or greater than 2500 MPa, or greater than 2600 MPa, or greater than 2700 MPa, or in the range from 2400 MPa to 3000 MPa, or in the range from 2600 MPa to 2800 MPa.

The yield strength of secondary coatings prepared as cured products from the curable secondary coating compositions disclosed herein is greater than 55 MPa, or greater than 60 MPa, or greater than 65 MPa, or greater than 70 MPa, or in the range from 55 MPa to 75 MPa, or in the range from 60 MPa to 70 MPa.

Figure 7:
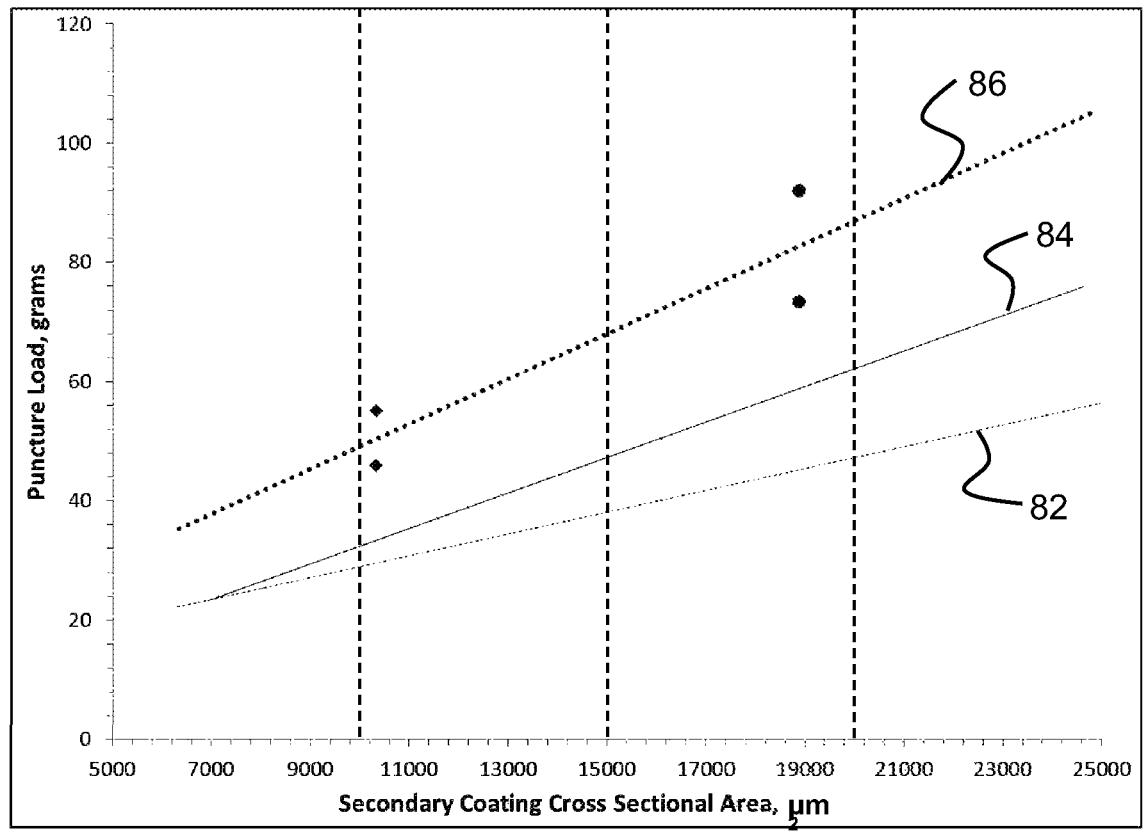
FIG. 7 shows the dependence of puncture load on cross-sectional area for three secondary coatings.

Secondary Coatings—Properties—Puncture Resistance. The puncture resistance of secondary coatings made from comparative curable secondary coating composition A, a commercial curable secondary coating composition (CPC6e) from a commercial vendor (DSM Desotech) having a proprietary composition, and curable secondary coating composition SD was determined according to the method described above. Several fiber samples with each of the three secondary coatings were prepared. Each fiber sample included a glass fiber with a diameter of 125 microns, a primary coating formed from the reference primary coating composition listed in Table 10, and one of the three secondary coatings. Samples with various secondary coatings were prepared. The thicknesses of the primary coating and secondary coating were adjusted to vary the cross-sectional area of the secondary coating as shown in FIG. 7. The ratio of the thickness of the secondary coating to the thickness of the primary coating was maintained at about 0.8 for all samples.

Fiber samples with a range of thicknesses were prepared for each of the secondary coatings to determine the dependence of puncture load on the thickness of the secondary coating. One strategy for achieving higher fiber count in cables is to reduce the thickness of the secondary coating. As the thickness of the secondary coating is decreased, however, its performance diminishes and its protective function is compromised. Puncture resistance is a measure of the protective function of a secondary coating. A secondary coating with a high puncture resistance withstands greater impact without failing and provides better protection for the glass fiber.

The puncture load as a function of cross-sectional area for the three coatings is shown in FIG. 7. Cross-sectional area is selected as a parameter for reporting puncture load because an approximately linear correlation of puncture load with cross-sectional area of the secondary coating was observed. Traces 82, 84, and 86 shows the approximate linear dependence of puncture load on cross-sectional area for the comparative secondary coatings obtained by curing the comparative CPC6e secondary coating composition, the comparative curable secondary coating composition A, and curable secondary coating composition SD; respectively. The vertical dashed lines are provided as guides to the eye at cross-sectional areas of 10000 micron$^2$, 15000 micron$^2$, and 20000 micron$^2$ as indicated.

The CPC6e secondary coating depicted in Trace 82 corresponds to a conventional secondary coating known in the art. The comparative secondary coating A depicted in Trace 84 shows an improvement in puncture load for high cross-sectional areas. The improvement, however, diminishes as the cross-sectional area decreases. This indicates that a secondary coating obtained as a cured product from comparative curable secondary coating composition A is unlikely to be suitable for low diameter, high fiber count applications. Trace 86, in contrast, shows a significant increase in puncture load for the secondary coating obtained as a cured product from curable secondary coating composition SD. At a cross-sectional area of 7000 micron$^2$, for example, the puncture load of the secondary coating obtained from curable secondary coating composition SD is 50% or more greater than the puncture load of either of the other two secondary coatings.

The puncture load of secondary coatings formed as cured products of the curable secondary coating compositions disclosed herein at a cross-sectional area of 10000 micron$^2$ is greater than 36 g, or greater than 40 g, or greater than 44 g, or greater than 48 g, or in the range from 36 g to 52 g, or in the range from 40 g to 48 g. The puncture load of secondary coatings formed as cured products of the curable secondary coating compositions disclosed herein at a cross-sectional area of 15000 micron$^2$ is greater than 56 g, or greater than 60 g, or greater than 64 g, or greater than 68 g, or in the range from 56 g to 72 g, or in the range from 60 g to 68 g. The puncture load of secondary coatings formed as cured products of the curable secondary coating compositions disclosed herein at a cross-sectional area of 20000 micron$^2$ is greater than 68 g, or greater than 72 g, or greater than 76 g, or greater than 80 g, or in the range from 68 g to 92 g, or in the range from 72 g to 88 g. Embodiments include secondary coatings having any combination of the foregoing puncture loads.

As used herein, normalized puncture load refers to the ratio of puncture load to cross-sectional area. The puncture load of secondary coatings formed as cured products of the curable secondary coating compositions disclosed herein have a normalized puncture load greater than $3.2 \times 10^{-3}$ g/micron$^2$, or greater than $3.6 \times 10^{-3}$ g/micron$^2$, or greater than $4.0 \times 10^{-3}$ g/micron$^2$, or greater than $4.4 \times 10^{-3}$ g/micron$^2$, or greater than $4.8 \times 10^{-3}$ g/micron$^2$, or in the range from $3.2 \times 10^{-3}$ g/micron$^2$ to $5.6 \times 10^{-3}$ g/micron$^2$, or in the range from $3.6 \times 10^{-3}$ g/micron$^2$ to $5.2 \times 10^{-3}$ g/micron$^2$, or in the range from $4.0 \times 10^{-3}$ g/micron$^2$ to $4.8 \times 10^{-3}$ g/micron$^2$.

Secondary Coatings—Properties—Microbending. The attenuation due to microbending of optical fibers was measured according to the wire mesh covered drum test described above. The optical fiber samples had a glass fiber with the relative refractive index profile 90 shown in FIG. 6. The glass fiber had a radius $r_4$=62.5 microns and was surrounded by a primary coating with thickness 36.5 microns, which was surrounded by a secondary coating with thickness 26 microns. The primary coating was formed from the reference primary coating composition listed in Table 10 and the secondary coating was formed from comparative coating composition A listed in Table 9. Measurements were made on several optical fibers and attenuation at 1550 nm as determined by the wire mesh covered drum test was observed to be between 0.05 dB/km and 0.8 dB/km for all samples. The attenuation of the optical fibers is less than 1.0 dB/km, or less than 0.8 dB/km, or less than 0.6 dB/km, or less than 0.4 dB/km, or less than 0.2 dB/km, or in the range from 0.05 dB/km-1.0 dB/km, or in the range from 0.15 dB/km-0.80 dB/km, or in the range from 0.30 dB/km-0.70 dB/km.

Design Examples—Coated Optical Fibers

Modeled Results. The experimental examples and principles disclosed herein indicate that by varying the mole numbers n, m, and p, it is possible to control the relative amount of di-adduct compound in the oligomer as well as the properties of cured films formed from the primary coating compositions over a wide range, including the ranges specified herein for Young's modulus and in situ modulus. Similarly, variations in the type and concentration of different monomers in the secondary composition leads to variations in the Young's modulus over the range disclosed herein. Curing dose is another parameter that can be used to vary modulus of primary and secondary coatings formed from the curable compositions disclosed herein.

To examine the effect of the thickness and modulus of the primary and secondary coatings on transmission of a radial force to a glass fiber, a series of modeled examples was considered. In the model, a radial external load P was applied to the surface of the secondary coating of an optical fiber and the resulting load at the surface of the glass fiber was calculated. The glass fiber was modeled with a Young's modulus of 73.1 GPa (consistent with silica glass) and a diameter of 125 microns. The Poisson ratios $v_p$ and $v_s$ of the primary and secondary coatings were fixed at 0.48 and 0.33, respectively. A comparative sample C1 and six samples M1-M6 in accordance with the present disclosure were considered. The comparative sample included primary and secondary coatings with thicknesses and moduli consistent with optical fibers known in the art. Samples M1-M6 are examples with reduced thicknesses of the primary and secondary coatings. Parameters describing the configurations of the primary and secondary coatings are summarized in Table 12.

TABLE 12

Coating Properties of Modeled Optical Fibers

| | Primary Coating | | | Secondary Coating | | |
|---|---|---|---|---|---|---|
| Sample | In Situ Modulus (MPa) | Diameter (microns) | Thickness (microns) | Young's Modulus (MPa) | Diameter (microns) | Thickness (microns) |
| C1 | 0.20 | 190 | 32.5 | 1600 | 242 | 26.0 |
| M1 | 0.14 | 167 | 21.0 | 1900 | 200 | 16.5 |
| M2 | 0.12 | 161 | 18.0 | 1900 | 190 | 14.5 |
| M3 | 0.10 | 155 | 15.0 | 2000 | 180 | 12.5 |
| M4 | 0.09 | 150 | 12.5 | 2300 | 170 | 10.0 |
| M5 | 0.12 | 145 | 15.0 | 2200 | 170 | 12.5 |
| M6 | 0.11 | 138 | 14.0 | 2200 | 160 | 11.0 |

Table 13 summarizes the load P1 at the outer surface of the glass fiber as a fraction of load P applied to the surface of the secondary coating. The ratio P1/P is referred to herein as the load transfer parameter and corresponds to the fraction of external load P transmitted through the primary and secondary coatings to the surface of the glass fiber. The load P is a radial load and the load transfer parameter P1/P was calculated from a model based on the equations below:

$$\frac{P_1}{P} = \frac{4(1-v_p)(1-v_s)}{\{A+B\}}$$

$$\text{where } A = \left(\frac{E_s(1+v_p)(1-2v_p)\left(1-(r_4/r_5)^2\right)\left(1-(r_5/r_6)^2\right)}{E_p(1+v_s)}\right)$$

$$\text{and } B = \left((1-2v_p(r_4/r_5)^2 + (r_4/r_5)^2)(1-2v_s(r_5/r_6)^2 + (r_5/r_6)^2)\right)$$

In the equations, $v_p$ and $v_s$ are the Poisson's ratios of the primary and secondary coatings, $r_4$ is the outer radius of the glass fiber, $r_5$ is the outer radius of the primary coating, $r_6$ is the outer radius of the secondary coating, E p is the in situ modulus of the primary coating, and E s is the Young's modulus of the secondary coating. The scaled load transfer parameter P1/P (scaled) in Table 13 corresponds to the ratio P1/P for each sample relative to comparative sample C1.

TABLE 13

Load Transfer Parameter (P1/P) at Surface of Glass Fiber

| Sample | P1/P | P1/P (scaled) |
|---|---|---|
| C1 | 0.0178 | 1.00 |
| M1 | 0.0171 | 0.97 |
| M2 | 0.0175 | 0.98 |
| M3 | 0.0172 | 0.97 |
| M4 | 0.0170 | 0.95 |
| M5 | 0.0167 | 0.94 |
| M6 | 0.0166 | 0.94 |

The modeled examples show that despite smaller coating thicknesses, optical fibers having primary and secondary coatings as described herein exhibit a reduction in the force experienced by a glass fiber relative to a comparative optical fiber having conventional primary and secondary coatings with conventional thicknesses. The resulting reduction in overall size of the optical fibers described herein enables higher fiber count in cables of a given size (or smaller cable diameters for a given fiber count) without increasing the risk of damage to the glass fiber caused by external forces.

The scaled load transfer parameter $P_1/P$ (scaled) of the secondary coating is less than 0.99, or less than 0.97, or less than 0.95. The load transfer parameter $P_1/P$ of the secondary coating is less than 0.0200, or less than 0.0180, or less than 0.0178, or less than 0.0176, or less than 0.0174, or less than 0.0172, or less than 0.0170, or less than 0.0168, or in the range from 0.0160-0.0180, or in the range from 0.0162-0.0179, or in the range from 0.0164-0.0178, or in the range from 0.0166-0.0177, or in the range from 0.0168-0.0176.

Fabricating the Optical Fibers

Figure 8:
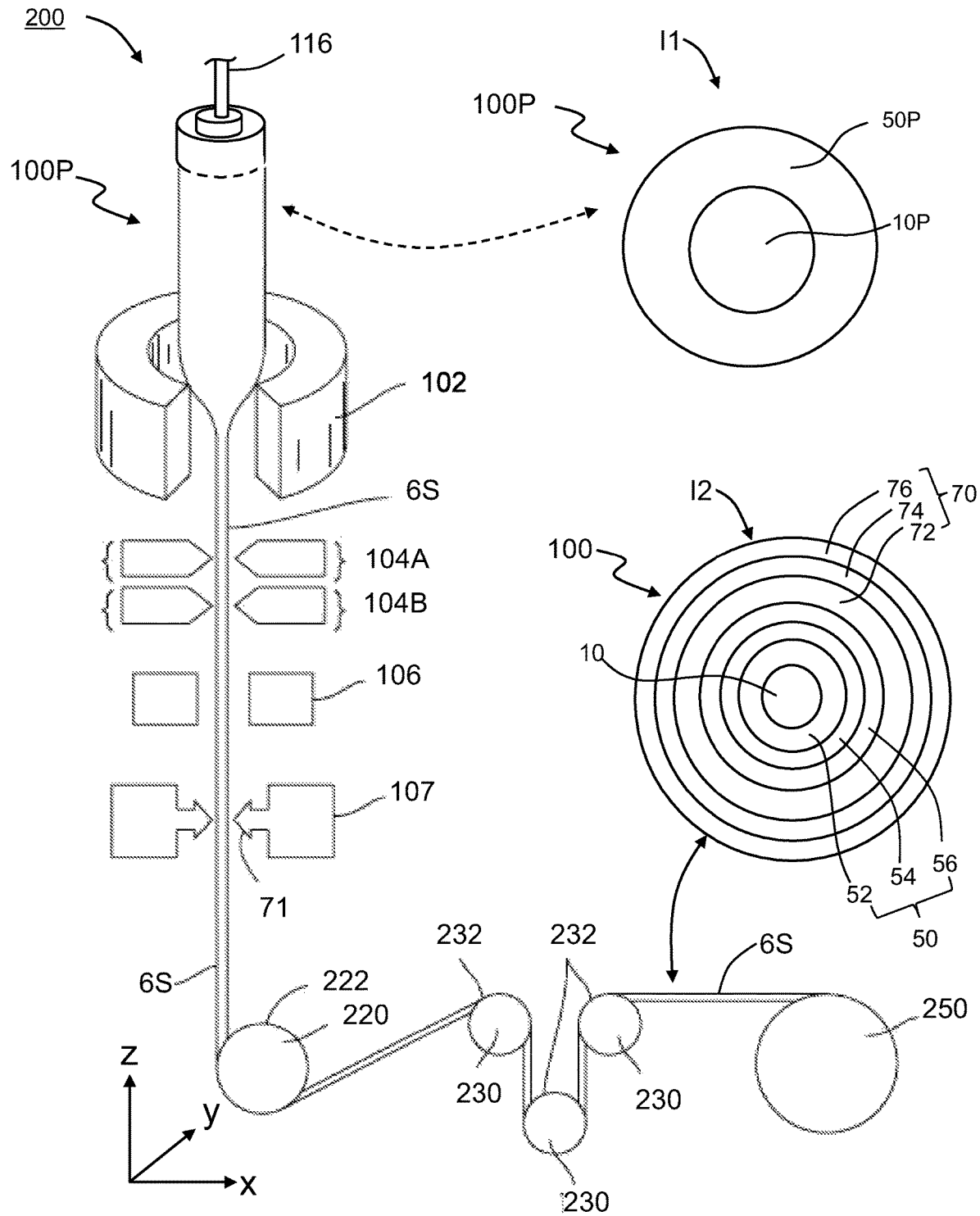
FIG. 8 is a schematic diagram of an exemplary optical fiber drawing system illustrating fabrication of an optical fiber, according to some embodiments.

FIG. 8 is a schematic diagram of an example optical fiber drawing system ("drawing system") 200 for drawing a glass preform 100P into the optical fiber 100, according to some embodiments. The optical fiber 100 can be fabricated using the drawing system 100 and fiber drawing techniques known in the art.

The core and cladding layers of the glass preform can be produced in a single-step process or multi-step process using chemical vapor deposition (CVD) methods which are well known in the art. A variety of CVD processes are known and are suitable for producing the core and cladding layers used in the optical fibers of the present invention. They include outside vapor deposition process (OVD) process, vapor axial deposition (VAD) process, modified CVD (MCVD), and plasma-enhanced CVD (PECVD).

As shown in FIG. 8, the exemplary drawing system 200 can include a draw furnace ("furnace") 102 for heating the glass preform 100P to the glass melt temperature. In an example, the fiber draw process is carried out a glass melt temperature, which in an example is in the range from 1800° C. to 1900° C. A preform holder 116 is used to hold the glass preform 100P.

In some embodiments, the drawing system 200 also includes non-contact measurement sensors 104A and 104B for measuring the size of a drawn (bare) optical fiber 100 that exits the draw furnace 102 for size (diameter) control. A cooling station 106 can reside downstream of the measurement sensors 104A and 104B and is configured to cool the bare optical fiber 100. A coating station 107 can reside downstream of the cooling station 106 and can be configured to deposit one or more protective coating materials 71 onto the bare optical fiber 100 to form the protective coating 70 including the primary coating 72 and the secondary coating 74. A tensioner 220 can reside downstream of the coating station 107. The tensioner 220 can have a surface 222 that pulls (draws) the coated optical fiber 100. A set of guide wheels 230 with respective surfaces 232 resides downstream of the tensioner 220. The guide wheels 230 can serve to guide the coated optical fiber 100 to a fiber take-up spool ("spool") 250 for storage.

In some embodiments, the close-up inset I1 of FIG. 8 shows a cross-sectional view of the glass preform 100P used to fabricate the single-core optical fiber 100. The glass preform 100P includes a preform core 10P and a preform cladding region 50P. In some embodiments, the preform core 10P can be either a step refractive index core or a graded refractive index core. The preform cladding 50P can include a preform inner cladding region, a preform depressed index cladding region, and a preform outer cladding region. The preform 100P can be fabricated using known techniques, such as an outside vapor deposition (OVD) process. The close-up inset I2 of FIG. 8 shows a cross-sectional view of the coated optical fiber 100, which can be referred to the descriptions above in connection with FIGS. 1 and 2.

The core and cladding of the disclosed optical fibers may be produced in a single-step operation or multi-step operation by methods which are well known in the art. Suitable methods include: the flame combustion methods, flame oxidation methods, flame hydrolysis methods, OVD (outside vapor deposition), IVD (inside vapor deposition), VAD (vapor axial deposition), double crucible method, rod-in-tube procedures, cane-in-soot method, and doped deposited silica processes. A variety of CVD processes are known and are suitable for producing the core, inner cladding region, and outer cladding region used in the optical fibers of the present disclosure. They include external CVD processes, axial vapor deposition processes, modified CVD (MCVD), inside vapor deposition, and plasma-enhanced CVD (PECVD).

Suitable precursors for silica include $SiCl_4$ and organosilicon compounds. Organosilicon compounds are silicon compounds that include carbon. Organosilicon compounds may also include oxygen and/or hydrogen. Examples of organosilicon compounds include OMCTS (octamethylcyclotetrasiloxane), silicon alkoxides $(Si(OR)_4)$, organosilanes $(SiR_4)$, and $Si(OR)_xR_{4-x}$, where R is a carbon-containing organic group or hydrogen and where R may be the same or different at each occurrence, subject to the proviso that at least one R is a carbon-containing organic group. Suitable precursors for chlorine doping include $Cl_2$, $SiCl_4$, $Si_2Cl_6$, $Si_2OCl_6$, $SiCl_3H$, and $CCl_4$. Suitable precursors for fluorine doping include $F_2$, $CF_4$, and $SiF_4$.

Summary and Clauses of the Description

Accordingly, one aspect of the present disclosure provides optical fiber cables having high transmission capacity, low transmission loss, similar size to traditional cables or cables with higher fiber densities. Another aspect of the present disclosure provides optical fibers in the cables having small diameter, low transmission loss, low microbending loss, and high puncture resistance.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. An optical fiber comprising:
   a glass fiber, the glass fiber including a core region and a cladding region surrounding and directly adjacent to the core region, the core region comprising silica glass doped with 1.5 wt % to 6 wt % chlorine and having an outer radius $r_1$ in a range from 3.0 microns to 10.0 microns, the cladding region having an outer radius $r_4$ greater than or equal to 50.0 microns and less than 70.0 microns;
   a primary coating with an outer radius $r_5$ surrounding and directly adjacent to the cladding region, a thickness $(r_5-r_4)$ in a range from 5.0 microns to 25.0 microns and an in situ modulus less than 0.30 MPa, the primary coating comprising a cured product of a coating composition comprising:
      a radiation curable monomer;
      an adhesion promotor, the adhesion promoter comprising an alkoxysilane compound or a mercapto-functional silane compound; and
      an oligomer comprising a polyether urethane acrylate compound and a di-adduct compound; and
   a secondary coating with an outer radius $r_6$ less than or equal to 110 microns surrounding and directly adjacent to the primary coating, the secondary coating having a thickness $(r_6-r_5)$ in a range from 8.0 microns to 30.0 microns, a Young's modulus greater than 2200 MPa, and a normalized puncture load greater than $3.6 \times 10^{-3}$ g/micron$^2$, the secondary coating comprising a cured product of a composition comprising:
      an alkoxylated bisphenol-A diacrylate monomer; and
      an acrylate monomer;
   wherein the optical fiber has a 22-meter cable cutoff wavelength less than 1530 nm, an attenuation at 1550 nm of less than 0.17 dB/km, a bending loss at 1550 nm, determined from a mandrel wrap test using a mandrel with a diameter of 20 mm, of less than 3.0 dB/turn, and a load transfer function P1/P of less than 0.0176.

2. The optical fiber of claim 1, wherein:
   the core region has a step index relative refractive index profile with a relative refractive index $\Delta_1$ in a range from 0.08% to 0.50%.

3. The optical fiber of claim 1, wherein:
the core region has a graded index relative refractive index profile with a maximum relative refractive index $\Delta_{1max}$ in a range from 0.08% to 0.30%.

4. The optical fiber of claim 1, wherein the chlorine has a concentration in a range from 2.0 wt % to 5.5 wt %.

5. The optical fiber of claim 1, wherein the cladding region comprises:
an inner cladding region surrounding and directly adjacent to the core region, the inner cladding region having an outer radius $r_2$ and a thickness $(r_2-r_1)$ in a range from 1 micron to 7 microns; and
an outer cladding region surrounding and directly adjacent to the inner cladding region, the outer cladding region having the outer radius $r_4$ in a range from 50 microns to 70 microns;

wherein a relative refractive index $\Delta_2$ of the inner cladding region is less than a relative refractive index $\Delta_4$ of the outer cladding region.

6. The optical fiber of claim 5, wherein:
the relative refractive index $\Delta_2$ is substantially zero; and
the relative refractive index $\Delta_4$ is in a range from 0.05% to 0.30%.

7. The optical fiber of claim 5, wherein:
the relative refractive index $\Delta_2$ is in a range from −0.25% to 0.0%; and
the relative refractive index $\Delta_4$ is substantially zero.

8. The optical fiber of claim 5, wherein:
the relative refractive index $\Delta_2$ is in a range from −0.25% to −0.0%; and
the relative refractive index $\Delta_4$ is in a range from 0.05% to 0.30%.

9. The optical fiber of claim 1, wherein the cladding comprises:
an inner cladding region surrounding and directly adjacent to the core region, the inner cladding region having a thickness $(r_2-r_1)$ in a range from 1 micron to 7 microns; and
a depressed index cladding region surrounding and directly adjacent to the inner cladding region, the depressed index cladding region having an outer radius $r_3$ in a range from 15 microns to 40 microns;
an outer cladding region surrounding and directly adjacent to the depressed index cladding region, the outer cladding region having the outer radius $r_4$ in a range from 50 microns to 70 microns;
wherein a relative refractive index $\Delta_3$ of the depressed index cladding region is less than a relative refractive index $\Delta_2$ of the inner cladding region and a relative refractive index $\Delta_4$ of the outer cladding region.

10. The optical fiber of claim 9, wherein the relative refractive index $\Delta_3$ is in a range from −0.025 to 0.0%.

11. The optical fiber of claim 9, wherein the relative refractive index $\Delta_2$ region is less than the relative refractive index $\Delta_4$.

12. The optical fiber of claim 1, wherein:
a diameter $2r_5$ of the primary coating is less than or equal to 190 microns; and
a diameter $2r_6$ of the secondary coating is less than or equal to 230 microns.

13. The optical fiber of claim 12, wherein the diameter $2r_5$ of the primary coating is less than or equal to 155 microns.

14. The optical fiber of claim 12, wherein the thickness $(r_5-r_4)$ is in a range from 10.0 microns to 17.0 microns.

15. The optical fiber of claim 12, wherein the diameter $2r_6$ of the secondary coating is less than or equal to 190 microns.

16. The optical fiber of claim 12, wherein the thickness $(r_6-r_5)$ is in a range from 8.0 microns to 20.0 microns.

17. The optical fiber of claim 1, wherein the normalized puncture load of the secondary coating is greater than $4.4 \times 10^{-3}$ g/micron$^2$.

18. The optical fiber of claim 1, wherein:
the polyether urethane acrylate compound has a molecular formula:

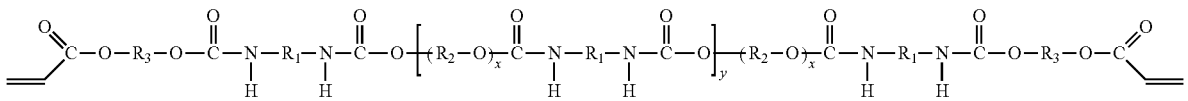

wherein:
$R_1$, $R_2$ and $R_3$ are independently selected from linear alkylene groups, branched alkylene groups, or cyclic alkylene groups;
y is 1, 2, 3, or 4; and
x is between 40 and 100; and
the di-adduct compound has a molecular formula:

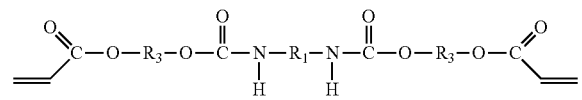

wherein the di-adduct compound is present in an amount of at least 1.0 wt % in the oligomer.

19. The optical fiber of claim 18, wherein the oligomer is the cured product of a reaction between:
a diisocyanate compound;
a hydroxy(meth)acrylate compound; and
a polyol compound, said polyol compound having unsaturation less than 0.1 meq/g;
wherein said diisocyanate compound, said hydroxy(meth)acrylate compound and said polyol compound are reacted in molar ratios n:m:p, respectively, wherein n is in the range from 3.0 to 5.0, m is within ±15% of 2n−4, and p is 2.

20. The optical fiber of claim 1, wherein the secondary coating is the cured product of the composition comprising:
the alkoxylated bisphenol-A diacrylate monomer in an amount greater than 55 wt %, the alkoxylated bisphenol-A diacrylate monomer having a degree of alkoxylation in the range from 2 to 16; and
the acrylate monomer in an amount in the range from 2.0 wt % to 25 wt %, wherein the acrylate monomer is a triacrylate monomer comprising an alkoxylated trimethylolpropane triacrylate monomer having a degree of alkoxylation in the range from 2 to 16 or a tris[(acryloyloxy)alkyl]isocyanurate monomer.

* * * * *

UNITED STATES PATENT AND TRADEMARK OFFICE
CERTIFICATE OF CORRECTION

PATENT NO. : 12,055,753 B2
APPLICATION NO. : 18/241178
DATED : August 6, 2024
INVENTOR(S) : Scott Robertson Bickham et al.

It is certified that error appears in the above-identified patent and that said Letters Patent is hereby corrected as shown below:

In the Claims

Claim 10: Line 59: "range from -0.025 to 0.0%" should state "range from -0.25 to 0.0%"

Signed and Sealed this
Eighteenth Day of February, 2025

Coke Morgan Stewart
*Acting Director of the United States Patent and Trademark Office*